US012106618B2

(12) United States Patent
Jonely et al.

(10) Patent No.: US 12,106,618 B2
(45) **Date of Patent: *Oct. 1, 2024**

(54) ISOLATION DEVICE

(71) Applicant: Master Lock Company LLC, Oak Creek, WI (US)

(72) Inventors: Michael B. Jonely, Oak Creek, WI (US); Scott Kalous, Oak Creek, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,017

(22) Filed: Jan. 30, 2023

(65) Prior Publication Data

US 2023/0290201 A1 Sep. 14, 2023

Related U.S. Application Data

(63) Continuation of application No. 17/166,264, filed on Feb. 3, 2021, now Pat. No. 11,568,691.

(Continued)

(51) Int. Cl.
*G07C 9/00* (2020.01)

(52) U.S. Cl.
CPC .................... *G07C 9/00309* (2013.01); *G07C 2009/00404* (2013.01); *G07C 2009/00539* (2013.01); *G07C 2009/00555* (2013.01)

(58) Field of Classification Search
CPC ...... G07C 9/00309; G07C 2009/00404; G07C 2009/00539; G07C 2009/00936;

(Continued)

(56) References Cited

U.S. PATENT DOCUMENTS 8,134,846 B2 3/2012 Lang et al.
9,208,456 B2 12/2015 McGinn et al.

(Continued)

OTHER PUBLICATIONS

Non-Final Office Action on U.S. Appl. No. 17/166,264 Dtd Aug. 18, 2022.

(Continued)

*Primary Examiner* — Vernal U Brown
(74) *Attorney, Agent, or Firm* — Foley & Lardner LLP

(57) ABSTRACT

A keysafe includes a housing, a door, a locking mechanism, a wireless communications interface, and an inhibitor system. The housing defines an internal compartment structured to receive a key fob for a vehicle. The door is positioned to enclose the internal compartment. The locking mechanism is positioned to selectively lock the door to prevent access to the internal compartment. The wireless communications interface is configured to facilitate wireless communication with an external device. The inhibitor system includes a coil disposed around the internal compartment, a battery disposed within the housing and coupled to the coil, and a controller. The controller is configured to energize the coil with the battery to inhibit communication between the key fob and the vehicle, receive a deactivation signal from the external device via the wireless communications interface, and de-energize the coil in response to receiving the deactivation signal to permit the communication.

19 Claims, 13 Drawing Sheets

Related U.S. Application Data

(60) Provisional application No. 62/970,665, filed on Feb. 5, 2020.

(58) Field of Classification Search
CPC ...... B60R 25/241; B60R 25/209; H04K 3/92; H04B 17/318
See application file for complete search history.

(56) References Cited

U.S. PATENT DOCUMENTS

| | | | |
|---|---|---|---|
| 9,940,764 B2 | 4/2018 | Van Wiemeersch et al. | |
| 11,285,917 B1 | 3/2022 | Wisnia et al. | |
| 11,568,691 B2 * | 1/2023 | Jonely ................ | G07C 9/00309 |
| 2015/0179377 A1 * | 6/2015 | Han ........................ | H01H 23/14 307/125 |

OTHER PUBLICATIONS

Notice of Allowance on U.S. Appl. No. 17/166,264 Dtd Nov. 30, 2022.

* cited by examiner

ISOLATION DEVICE

CROSS-REFERENCE TO RELATED PATENT APPLICATION

This application is a continuation of U.S. patent application Ser. No. 17/166,264, filed Feb. 3, 2021, which claims the benefit of and priority to U.S. Provisional Patent Application No. 62/970,665, filed Feb. 5, 2020, both of which are incorporated herein by reference in their entireties.

BACKGROUND

A large number of today's vehicles feature keyless entry and push button keyless start that do not require the user to push a button on the key fob to gain access to or start the vehicle. Such systems allow entry to the vehicle by transmitting an on-off modulated data packet via a low frequency (e.g., 125 kilohertz ("kHz")) carrier from an antenna located in the door. This low frequency communication from the vehicle to the key fob is typically initiated by touching, moving, or pushing a button on the door handle. The low frequency data packet is received by the active key fob, and if the data packet is recognizable by the particular key fob, the key fob will then transmit an ultra-high frequency ("UHF") response (e.g., typically 315 megahertz ("MHz"), 433 MHz, or 900 MHz for U.S.-based vehicle models) to the vehicle. The vehicle will then unlock/open the door based on the response. When the start button of the vehicle is pressed, another data packet is transmitted to the key fob, and again if the data packet is recognizable by the key fob, the key fob will transmit to a second UHF response to the vehicle to facilitate starting the vehicle.

SUMMARY

One embodiment relates to a keysafe. The keysafe includes a housing, a wireless communications interface, a user interface disposed along an exterior of the housing, and an inhibitor system. The housing defines an internal compartment structured to receive a key fob for a vehicle. The wireless communications interface is configured to facilitate wireless communication with an external device. The inhibitor system includes a coil disposed around the internal compartment and a controller. The controller is configured to energize the coil to inhibit at least one of (i) a vehicle signal transmitted by the vehicle such that (a) the vehicle signal does not reach the key fob or (b) the vehicle signal is unrecognizable by the key fob or (ii) a key fob signal transmitted by the key fob such that (a) the key fob signal does not reach the vehicle or (b) the key fob signal is unrecognizable by the vehicle; receive a deactivation signal from at least one of (i) the external device via the wireless communications interface or (ii) the user interface in response to an input provided thereto, and de-energize the coil in response to receiving the deactivation signal such that the vehicle signal reaches the key fob in a recognizable form, the key fob transmits the key fob signal to the vehicle in response to the vehicle signal, and the key fob signal reaches the vehicle in a recognizable form.

Another embodiment relates to a keysafe. The keysafe includes a housing, a door, an inhibitor, and a controller. The housing defines an internal compartment structured to receive a key fob for a vehicle. The door is positioned to enclose the internal compartment. The inhibitor is positioned to facilitate selectively inhibiting communication between the key fob and the vehicle. The controller configured to control the inhibitor. The inhibitor is operable in a first mode where communication between the key fob and the vehicle is inhibited. The inhibitor is operable in a second mode where the communication between the key fob and the vehicle is permitted.

Still another embodiment relates to a keysafe. The keysafe includes a housing, a door, a locking mechanism, a wireless communications interface, and an inhibitor system. The housing defines an internal compartment structured to receive a key fob for a vehicle. The door is positioned to enclose the internal compartment. The locking mechanism is positioned to selectively lock the door to prevent access to the internal compartment. The wireless communications interface is configured to facilitate wireless communication with an external device. The inhibitor system includes a coil disposed around the internal compartment, a battery disposed within the housing and coupled to the coil, and a controller. The controller is configured to energize the coil with the battery to inhibit communication between the key fob and the vehicle, receive a deactivation signal from the external device via the wireless communications interface, and de-energize the coil in response to receiving the deactivation signal to permit the communication.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "disconnected device" means a device that is incapable of communicating directly with a server, but rather requires an intermediary device (e.g., a smartphone, etc.) in short-range communication with the disconnected device to facilitate the transmission of data between the disconnected device and the sever. As utilized herein, the term "connected device" means a device that is capable of communicating directly with a server (e.g., using a long-range communication protocol, cellular, radio, Wi-Fi, etc.) without the need of such an intermediary device (excluding a router/modem of a Wi-Fi architecture). As utilized herein, the term "key" (e.g., device key, user key, cryptographic key, etc.) means a numeric or alphanumeric code, which, for example, may be a parameter used in a block cipher algorithm that determines a forward cipher function. As utilized herein, the term "nonce" (e.g., handshake nonce, reply nonce, modified reply nonce, etc.) means a value that is used only once within a specified context.

System Overview

Figure 1:
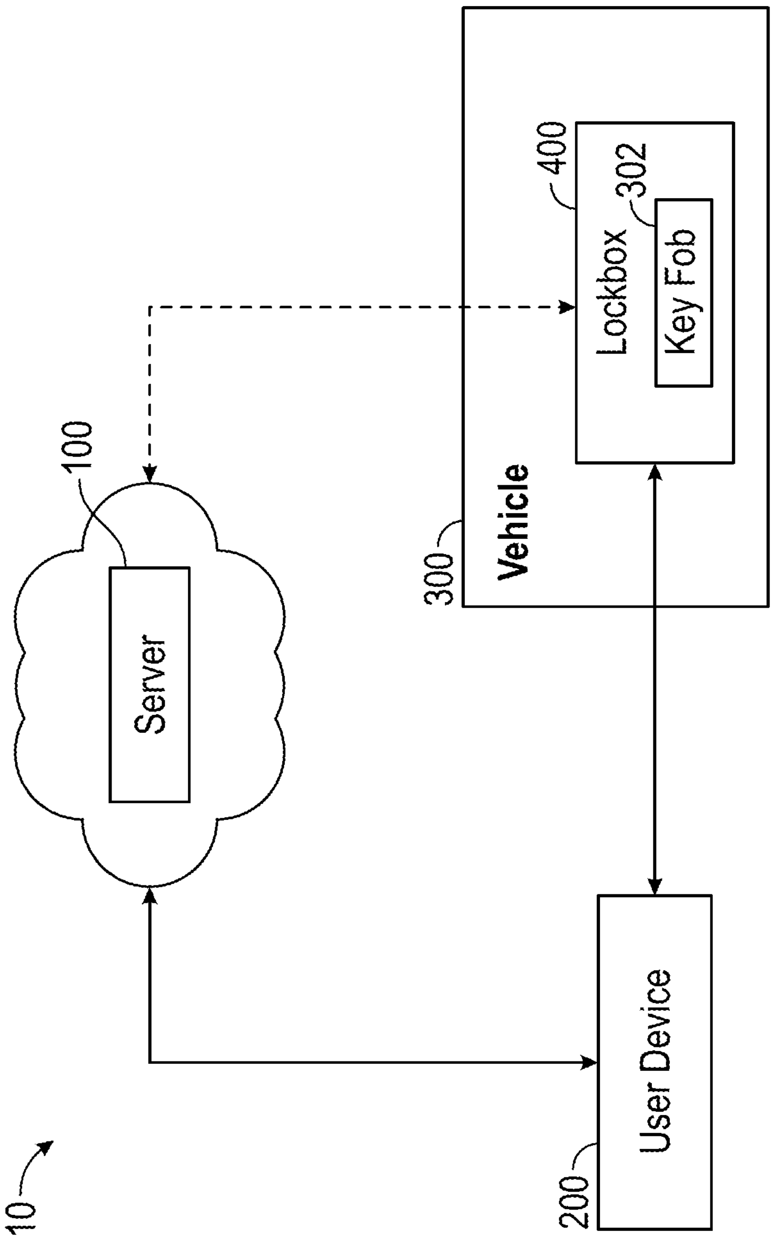
FIG. 1 is a block diagram of a key fob isolation system including a server, a user device, and a lockbox positioned within a vehicle, according to an exemplary embodiment.

According to the exemplary embodiment shown in FIG. 1, a key fob inhibitor system, shown as key fob isolation system 10, includes a remote sever (e.g., a credential management server, a profile management server, etc.), shown as server 100; a portable device (e.g., a smartphone, a mobile phone, a cell phone, a tablet, a laptop, a smartwatch, a smartcard, a keycard, etc.), shown as user device 200; a vehicle, shown as vehicle 300; a key device, shown as key fob 302, associated with the vehicle 300; and a keysafe, shown as lockbox 400. As shown in FIG. 1, the server 100 is configured to communicate with the user device 200 (e.g., using a first communication protocol, using a long-range communication protocol, cellular, Wi-Fi, radio, etc.) and the user device 200 is configured to communicate with the lockbox 400 (e.g., using a second communication protocol, using a short-range communication protocol, Bluetooth, Bluetooth low energy ("BLE"), near-field communication ("NFC"), radio frequency identification ("RFID"), etc.). The user device 200 may thereby function as an intermediary device that facilitates data transmissions between the server 100 and the lockbox 400 (e.g., if the lockbox 400 is a disconnected device, etc.). In some embodiments, the vehicle 300 functions as an intermediary between the server 100 and the lockbox 400 (e.g., if the vehicle 300 includes a long-range wireless communications interface such as a cellular capabilities, etc.). In some embodiments, the lockbox 400 is configured to facilitate direct communication with the server 100 (e.g., using a long-range communication protocol, cellular, Wi-Fi, radio, etc.). In some embodiments, the server 100 is or includes a plurality of servers. In some embodiments, the server 100 communicates with a plurality of user devices 200 and/or vehicles 300. In some embodiments, the user device 200 communicates with a plurality of lockboxes 400. In some embodiments, a plurality of user devices 200 communicate with the lockbox 400. In some embodiments, the server 100 communicates with a plurality of lockboxes 400.

According to an exemplary embodiment, the server 100 is configured to manage a plurality of access credentials or user profiles for a plurality of users that have access the lockbox 400. The server 100 is further configured to selectively deliver one or more of the user profiles of a respective user to a respective user device 200 (e.g., owned, operated, etc. by the respective user). In general, a user profile may include one or more files that include data related to operation of a respective lockbox 400. For example, the user profile may contain a user schedule of when an associated lockbox 400 may be accessed (e.g., unlocked, locked, active key fob isolation, deactivate key fob isolation, etc.). The schedule may specify access permissions, e.g., by day of the week, including starting times (hours, minutes, etc.) and ending times (hours, minutes, etc.) for each corresponding permission. For example, a schedule may specify the time spans in which the associated lockbox 400 may be deactivated and/or unlocked via the user device 200 of the specific user associated with the user profile. As another example, the schedule may specify time periods in which typical interactions are expected to occur, and a level of trust may be determined based on these time periods. Accordingly, an unlock request sent within an expected time period may be more trusted by the associated lockbox 400 than a request sent at an unexpected/atypical time. In one embodiment, a default user schedule is set (e.g., by the manufacturer, etc.). Additionally, a list of typical user schedules may also be provided to allow a user to select from one of many configuration options. In this manner, a manufacturer may provide various recommended operational settings to a user. A user may also customize a schedule to tailor the schedule as he or she desires (e.g., an administrator, etc.).

A user profile may further specify a model/serial number of the associated lockbox 400 and what types of accesses are available for that user. For example, such accesses may include: reading software/hardware version information of the associated lockbox 400, updating software of the associated lockbox 400, reading a lock state of the associated lockbox 400, locking, unlocking, activating an isolation mode, deactivating an isolation mode, reading/setting a time/clock value, reading a battery level, reading/clearing event related data (e.g., flags, counters, etc.), reading a log of events, reading/setting/resetting a keypad code of the associated lockbox 400, reading communications data for the associated lockbox 400 (e.g., transmission statuses, transmission power levels, channel information, addressing information, etc.), reading/setting default values stored for the associated lockbox 400 (e.g., default disarm times, default unlock times, etc.), among others. A user profile may also specify a start time and a revocation date/time for the user profile (i.e., when the user profile begins to be valid and when the user profile expires and is no longer valid). A user profile may provide maximum disarm/unlock tines for the associated lockbox 400. A user profile may also provide an indication of a trust level of a corresponding user device 200 (e.g., whether a time value/timestamp provided by the user device 200 is trusted or not). The lockbox 400 may be configured to allow or disallow certain functionality based on the trust level of a respective user device 200 requesting access thereto. The trust level may be stored as an independent permission that the user may or may not have access to (e.g., the trust level may be managed/adjusted by the software of the lockbox 400, the user device 200, the server 100, etc.). As an example, only a highly trusted user device 200 may be able to upgrade the firmware of a respective lockbox 400, open the respective lockbox 400, or change certain settings.

Additionally, the lockbox 400 may have a security algorithm that factors in a trust level and time value. For example, as a respective user device 200 successfully interacts with a respective lockbox 400 more often, the respective lockbox 400 may increase (or adjust) a trust level for the respective user device 200. However, if a time value is out of sync with the maintained time of the respective lockbox 400 or authentication fails, the respective lockbox 400 may decrease (or adjust) a trust level for the respective user device 200. The time value provided by the respective user device 200 may be compared to a time value maintained by the respective lockbox 400, and a degree of closeness between the two times may be used to indicate a trust level for the respective user device 200 (e.g., the closer the two times are to being in sync, the higher the trust level, etc.). If a trust level decreases below a certain threshold, the respective lockbox 400 may discontinue or limit interactions with the respective user device 200. A trust level may also be based on the schedule discussed above. For example, a respective user device 200 may be regarded as more or less trusted based on the time the respective user device 200 is accessing a respective lockbox 400, and whether that time falls within certain time periods as defined by the schedule. The time value provided by the respective user device 200 may also be used to sync the clock of a respective lockbox 400 with that of the respective user device 200 or may be otherwise used during authenticated communications. Any of the user profile items discussed may have default values (e.g., manufacturer defaults) or user provided values (e.g., from a user with administrator permission access, etc.). A user profile is not limited to the above data, and additional data may be included or excluded.

According to an exemplary embodiment, the key fob isolation system 10 implements an approach that provides for secure communication between the user device 200 and the lockbox 400 using a two key authentication scheme, without both keys being stored on the lockbox 400 (e.g., during a manufacturing phase). In such an embodiment, (i) a first key or a device key is known/stored on the lockbox 400 and the server 100 that is unique to the lockbox 400 and (ii) a second key or a user key is (a) known/stored on the user device 200 that is unique to the user device 200 or user profiles and (b) not pre-stored on the lockbox 400. Each device key, each user key, and each user profile may be specific to a respective lockbox 400. In this manner, the device key, the user key, and the user profile may uniquely relate to a single lockbox 400. According to an exemplary embodiment, the server 100 is configured to encrypt each user profile with the device key of the lockbox 400 that the user profile is associated with. When attempting to access a lockbox 400, a user device 200 may receive a lockbox identifier from the lockbox 400 and compare the lockbox identifier to a list of lockbox identifiers associated with one or more encrypted user profiles currently loaded onto the user device 200. If a match is found, the user device 200 may transmit the associated encrypted user profile to the lockbox 400. The encrypted user profile includes the user key. The lockbox 400 may decrypt the encrypted user profile using the device key pre-stored thereon to obtain the user key. The user device 200 may then generate and transmit an encrypted command to the lockbox 400. The encrypted command is encrypted using the user key. The lockbox 400 may then decrypt the encrypted command using the user key obtained from the decrypted user profile and initiate the action specified by the decrypted command (e.g., unlocking a physical locking component, implementing a firmware update, deactivate a key fob isolation mode, etc.). In some embodiments, the two key authentication process including the device key and the user key additionally includes a handshake nonce, a reply nonce, and/or a modified reply nonce, as described in more detail herein. In some embodiments, the key fob isolation system 10 implements a similar approach that provides for secure communication between (i) the server 100 and the lockbox 400 for a lockbox 400 that is in direct communication with the server 100 and/or (ii) the vehicle 300 and the lockbox 400 where the vehicle 300 functions as an intermediary and commands are provided by the server 100 to the lockbox 400 through the vehicle 300. Example embodiments of an authentication scheme that may be utilized in conjunction with the features of the present disclosure are found in U.S. Pat. Nos. 9,600,949 and 9,894,066, both of which are incorporated herein by reference in their entireties.

It should be understood that the two key authentication scheme described herein is not meant to be limiting, but is provided as an example of one possible way to provide secure communication between the server 100, the user device 200, the vehicle 300, and/or the lockbox 400 of the key fob isolation system 10. In other embodiments, secure communication is otherwise established using a different authentication scheme such as an authentication scheme that employs digital signatures, challenge-response procedures, multi-factor authentication (e.g., two-factor authentication, user profile plus a biometric, a user profile plus a PIN, etc.), and/or still other suitable authentication schemes.

The lockbox 400 is operable in various modes and states including a locked state, an unlocked state, an active key fob isolation mode, a reactive key fob isolation mode, and a deactivated mode. The lockbox 400 may be in the locked state during the active key fob isolation mode, the reactive key fob isolation mode, and the deactivated mode. In the locked state, the key fob 302 is locked within the lockbox 400. In the unlocked state, the key fob 302 is removable from the lockbox 400. Transitioning from the locked state to the unlocked state may require either (i) receiving, by the lockbox 400, an unlock command from the server 100, the user device 200, or the vehicle 300 (e.g., using the two key authentication scheme described herein, etc.) or (ii) receiving the unlock command through a user interface of the lockbox 400 (e.g., receiving a first PIN; a first manual access code; receiving an indication that an unlock button is selected and receiving a biometric or the first PIN; etc.).

In the deactivated mode, the lockbox 400 does not isolate the key fob 302 such that the key fob 302 can receive one or more request signals from the vehicle 300 (e.g., a door unlock request signal, an engine/vehicle start request signal, etc.) and the key fob 302 can transmit one or more response signals (e.g., a door unlock command, an engine/vehicle start command, etc.) while positioned within the lockbox 400. In the active key fob isolation mode, the lockbox 400 (i) actively (e.g., continuously, substantially continuously, periodically, etc.) isolates the key fob 302 such that the one or more the request signals transmitted by the vehicle 300 cannot reach the key fob 302 or (ii) actively (e.g., continuously, substantially continuously, periodically, etc.) outputs inhibition signals such that the one or more request signals are inhibited and unrecognizable by the key fob 302. The key fob 302, therefore, does not provide the one or more response signals during the active key fob isolation mode.

In the reactive key fob isolation mode, the lockbox 400 may perform one of the three following procedures. First, the lockbox 400 may (i) detect the one or more request signals transmitted by the vehicle 300 and (ii) reactively output inhibition signals such that the one or more request signals are inhibited and unrecognizable by the key fob 302 and, therefore, the key fob 302 does not provide the one or more response signals. Second, the lockbox 400 may (i) detect the one or more request signals transmitted by the vehicle 300 and (ii) reactively output inhibition signals such that the one or more response signals transmitted by the key fob 302 in response to receiving the one or more request signals are inhibited and unrecognizable by the vehicle 300 and, therefore, the vehicle 300 does not act on the one or more response signals. Third, the lockbox 400 may (i) detect a first request signal transmitted by the vehicle 300 (e.g., a door unlock request signal, etc.) and then (ii) initiate the active key fob isolation mode such that a second, subsequent request signal (e.g., a vehicle start request signal, etc.) cannot reach or is unrecognizable by the key fob 302. Therefore, during the third procedure, the key fob 302 may transmit a first response signal (e.g., a door unlock command, etc.) to the vehicle 300, but will not transmit a second response signal (e.g., an engine/vehicle start command, etc.) to the vehicle 300.

The reactive key fob isolation mode of the lockbox 400 may consume less power than the active key fob isolation mode and, therefore, may facilitate longer battery life for the lockbox 400. Transitioning from (a) the active key fob isolation mode or the reactive key fob isolation mode to (b) the deactivated mode may require either (i) receiving, by the lockbox 400, a deactivation command from the server 100, the user device 200, or the vehicle 300 (e.g., using the two key authentication scheme described herein, etc.) or (ii) receiving the deactivation command through the user interface of the lockbox 400 (e.g., receiving a second PIN different than the first PIN used to unlock the lockbox 400; receiving a second manual access code; receiving an indication that a deactivate button is selected and receiving a biometric or the second PIN; etc.).

The lockbox 400 and the key fob isolation system 10 may provide various advantages relative to traditional keysafes and lockboxes including that the key fob isolation system 10 facilitates remotely turning on and off the isolation mode of the lockbox 400. This allows the lockbox 400 to be located inside the vehicle 300 and still allow a user to lock the doors thereof. Further, a lockbox inside a locked vehicle is far more secure than the one mounted on a window thereof, which is a typical location today. Additionally, a lockbox inside the vehicle 300 also does not need to be removed when the vehicle 300 is driven or put through a car wash, which is common for most designs today. Also, the key fob 302 does not actually need to be removed from the lockbox 400 for the vehicle 300 to be unlocked and started. Therefore, if the key fob 302 is never removed from the lockbox 400, it is significantly less likely that the key fob 302 will be lost or misplaced. The key fob isolation system 10 may be used by individual vehicle owners, dealerships, and/or ride sharing companies, among others.

Server

Figure 2:
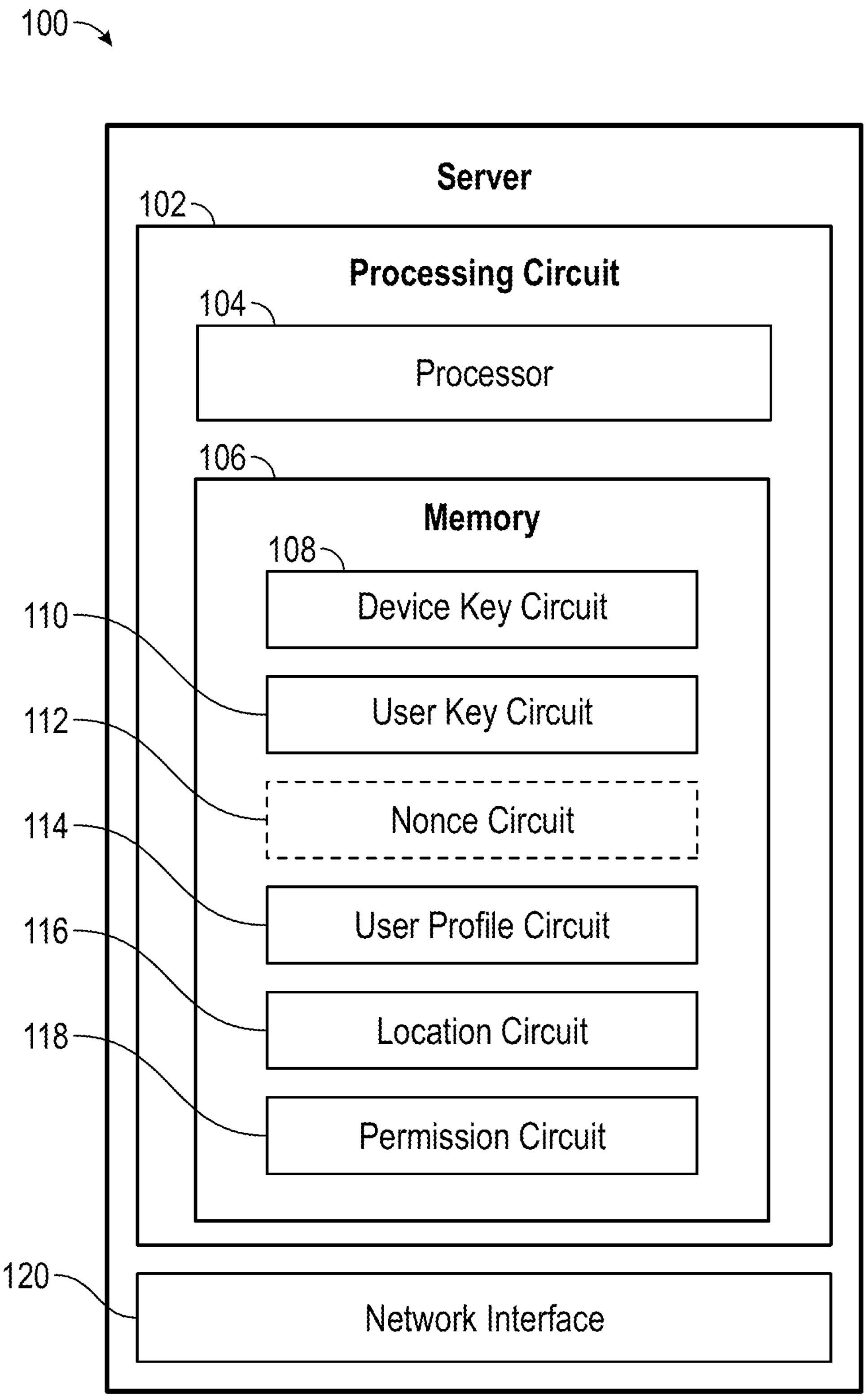
FIG. 2 is a schematic block diagram of the server of FIG. 1, according to an exemplary embodiment.

As shown in FIG. 2, the server 100 includes a processing circuit 102 and a network interface 120. The processing circuit 102 has a processor 104 and a memory 106. The processing circuit 102 may include a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. In some embodiments, the processor 104 is configured to execute computer code stored in the memory 106 to facilitate the activities described herein. The memory 106 may be any volatile or non-volatile computer-readable storage medium capable of storing data or computer code relating to the activities described herein. According to an exemplary embodiment, the memory 106 includes computer code modules (e.g., executable code, object code, source code, script code, machine code, etc.) configured for execution by the processor 104.

According to an exemplary embodiment, the network interface 120 is configured to facilitate wireless communication from and to the server 100 (i) directly to and from the user devices 200, (ii) indirectly to and from at least one of the lockboxes 400 through the user devices 200 (e.g., for lockboxes 400 that are disconnected devices), (iii) indirectly to and from at least one of the lockboxes 400 through the vehicle 300 (e.g., for lockboxes 400 that are disconnected devices and where the vehicle 300 includes long-range wireless communication capabilities to communicate with the server 100), and/or (iv) directly to and from at least one of the lockboxes 400 (e.g., for lockboxes 400 that are connected devices). The server 100 may communicate with the user devices 200, the vehicle 300, and/or the lockboxes 400 directly or via an intermediate network (e.g., an internet network, a cellular network, etc.). For example, the network interface 120 may include physical network components (e.g., a network card, etc.) configured to allow the server 100 to establish a connection to the user devices 200, the vehicles 300, and/or the lockboxes 400. In some embodiments, communications from the network interface 120 are routed through a cellular interface, allowing the server 100 to communicate with the user devices 200, the vehicle 300, and/or the lockboxes 400 via a cellular network. In some embodiments, the network interface 120 allows the server 100 to establish an Internet-based connection with the user devices 200, the vehicles 300, and/or the lockboxes 400. The server 100 may be one server (a physical or virtual server) or may include multiple servers.

According to an exemplary embodiment, the memory 106 of the server 100 includes various modules or circuits configured to (a) generate and securely store the device keys, the user keys, and the user profiles and selectively deliver encrypted user profiles (e.g., each including an associated user key) to the user devices 200 and/or the vehicles 300, and/or (b) transit the encrypted user profiles and/or commands to the lockboxes 400, directly (e.g., if a user is outside of short range communication of a lockbox 400 and interfaces through the server 100 over the Internet to remotely unlock or deactivate the lockbox 400, etc.).

As shown in FIG. 2, the memory 106 of the server 100 includes a device key circuit 108, a user key circuit 110, a nonce circuit 112, a user profile circuit 114, a location circuit 116, and a permission circuit 118. In some embodiments, the memory 106 does not include the nonce circuit 112. The device key circuit 108 is configured to generate and securely store the device keys (e.g., which may be provided to the lockboxes 400 at the time of manufacturing, etc.). As an example, the device key circuit 108 may correspond to a first database of keys and may include the software configured to store and retrieve such keys from the first database. The device key circuit 108 may be further configured to facilitate updating, replacing, or deleting the device keys (e.g., if a respective device key on a respective lockbox 400 is compromised, etc.), which may be propagated to the associated lockboxes 400 (e.g., directly for connected devices, indirectly for disconnected devices through the user devices 200 and/or the vehicles 300, etc.).

The user key circuit 110 is configured to generate and securely store the user keys (e.g., when a user is registered to a respective lockbox 400, etc.). As an example, the user key circuit 110 may correspond to a second database of keys and may include the software configured to store and retrieve such keys from the second database. The user key circuit 110 may be further configured to facilitate updating, replacing, or deleting the user keys (e.g., if a user's access is revoked, if a user key expires, etc.), which may be updated in the associated user profile as necessary.

The nonce circuit 112 is configured to generate a handshake nonce for each of the user profiles each time the user profiles are transmitted to the user devices 200. In some embodiments, the handshake nonce is not used.

The user profile circuit 114 is configured to generate and securely store the user profiles. As an example, the user profile circuit 114 may correspond to a third database of user profiles and may include the software configured to store and retrieve such user profiles from the third database. The user profile circuit 114 may be further configured to facilitate updating, replacing, or deleting the user profiles. By way of example, the user profile circuit 114 may be configured to generate a user profile for a specific user and/or lockbox 400 when a new user is added to a respective lockbox 400, in response to a respective user profile expiring, etc. The user profile circuit 114 is further configured to encrypt the user profiles prior to or as they are being transmitted to the user devices 200, the vehicles 300, and/or the lockboxes 400. By way of example, when a user profile is transmitted to a respective user device 200 and/or a respective vehicle 300, the user profile circuit 114 may be configured to (i) insert the associated user key into or append the associated key to the user profile, (ii) encrypt the user profile and user key using (a) the device key associated with a specific lockbox 400 and/or (b) the handshake nonce (in embodiments where the handshake nonce is used) to generate an encrypted user profile, and/or (iii) append (a) the user key and/or (b) the handshake nonce (in embodiments where the handshake nonce is used) to the encrypted user profile. The user profile circuit 114 may be further configured to facilitate updating, replacing, or deleting the user profiles (e.g., if a user's access is revoked, if a user key is updated, etc.).

The location circuit 116 is configured to receive location data from the user devices 200, the vehicles 300, and/or the lockboxes 400 regarding the current location (e.g., in real-time) and/or the last known location of the lockboxes 400. The location data may be generated by the user devices 200, the vehicles 300, and/or the lockboxes 400 as described in more detail herein. The location data may be used to monitor and track the location of the lockboxes 400.

The permission circuit 118 is configured to receive and store access permissions for users associated with one or more of the lockboxes 400. The access permissions may include an authorization or clearance level of the user (e.g., administrator clearance, limited clearance, etc.) that defines which of the lockboxes 400 the respective user is able to access and/or limit their access thereto (e.g., a first user may only activate/deactivate the key fob isolation feature of a respective lockbox 400 but not lock/unlock the respective lockbox 400, while a second user may unlock/lock the respective lockbox 400 and activate/deactivate the key fob isolation feature thereof, etc.). The access permissions may also include an access schedule as described in more detail herein that limits the times during which a user may access a respective lockbox 400 and/or that affects the trust level of a user attempting to access a respective lockbox 400 outside of the access schedule.

User Device

In general, the user device 200 is configured to selectively store various encrypted user profiles received from the server 100 to facilitate accessing (e.g., locking/unlocking, activating/deactivating, etc.) and/or at least partially managing the operation of the lockboxes 400 to which the user device 200 has access. As one example, the user device 200 may be used to unlock and lock the lockboxes 400. As another example, the user device 200 may be used to activate and deactivate the key fob isolation feature of the lockboxes 400. As still another example, the user device 200 may be used to otherwise manage the functions of the lockboxes 400 (e.g., change settings, update firmware, change PINs, etc.). The user device 200 may access and/or manage the lockboxes 400 through the use of an application ("app") that is configured to run on the user device 200. For example, the app may be installed on a portable device, and the app may be used to configure and/or control the lockboxes 400 over a wireless connection. In some embodiments, the user device 200 is a portable device such as a smartphone, a cell phone, a mobile phone, a tablet, a smart watch, a laptop computer, and/or another type of suitable portable device. In another embodiment, the user device 200 is a desktop computer or other non-portable computing device (e.g., which may communicate with the lockboxes 400 through the server 100 alone or the server 100 and the vehicle 300 together, etc.).

Figure 3:
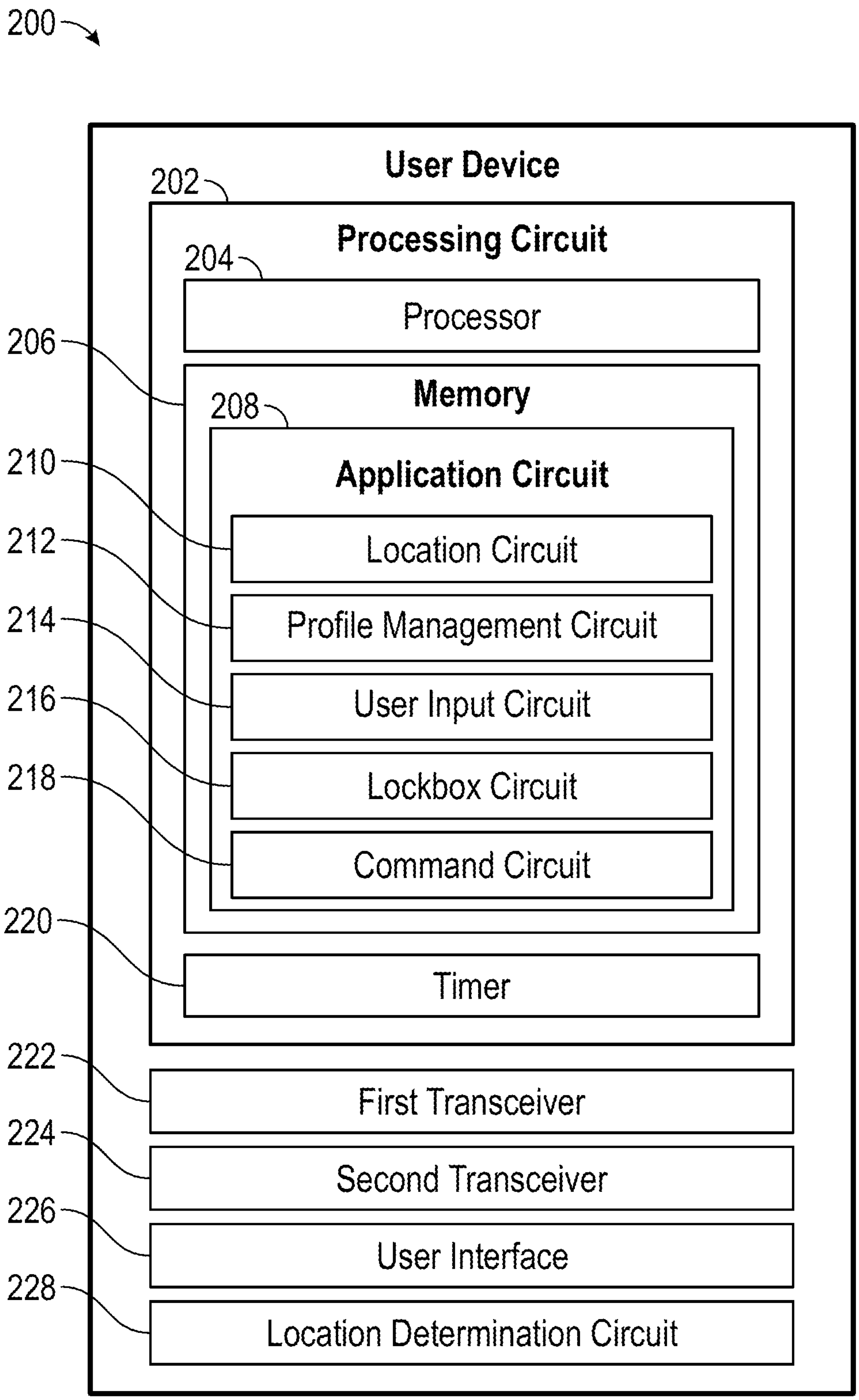
FIG. 3 is a schematic block diagram of the user device of FIG. 1, according to an exemplary embodiment.

As shown in FIG. 3, the user device 200 includes a processing circuit 202, a first transceiver 222, a second transceiver 224, a user interface 226, and a location determination circuit 228. The processing circuit 202 has a processor 204, a memory 206, and a timer 220. The processing circuit 202 may include a general-purpose processor, an ASIC, one or more FPGAs, a DSP, circuits containing one or more processing components, circuitry for supporting a microprocessor, a group of processing components, or other suitable electronic processing components. In some embodiments, the processor 204 is configured to execute computer code stored in the memory 206 to facilitate the activities described herein. The memory 206 may be any volatile or non-volatile computer-readable storage medium capable of storing data or computer code relating to the activities described herein. According to an exemplary embodiment, the memory 206 includes computer code modules (e.g., executable code, object code, source code, script code, machine code, etc.) configured for execution by the processor 204. The timer 220 is configured to maintain a time value for the user device 200. For example, the timer 220 may be the clock of the processor 204 or may be any other time keeping circuit of the user device 200. The time value maintained by the timer 220 may be used in secured communications (e.g., in syncing time with the lockboxes 400, in providing timestamps related to events for logging purposes, etc.).

According to an exemplary embodiment, (i) the first transceiver 222 is configured to facilitate communication between the user device 200 and the server 100 using a first communication protocol and (ii) the second transceiver 224 is configured to facilitate communication between the user device 200 and the lockboxes 400 using a second communication protocol. In some embodiments, the first communication protocol and the second communication protocol are different. By way of example, the first communication protocol may be a long-range communication protocol and the second communication protocol may be a short-range communication protocol. In an alternative embodiment, the user device 200 communicates with the server 100 and the lockboxes 400 using the same transceiver (e.g., only the first transceiver 222). In one embodiment, the first transceiver 222 includes cellular components for communicating with the server 100 via a cellular network. In another embodiment, the first transceiver 222 includes wired or wireless (e.g., Wi-Fi) components for communicating with the server 100 over the Internet or other network. In one embodiment, the second transceiver 224 includes Bluetooth components for establishing a Bluetooth connection with the lockboxes 400. In another embodiment, the second transceiver 224 includes a different type of components that facilitate a different type of short-range and/or wireless communication protocol (e.g., radiofrequency, RFID, Wi-Fi, Bluetooth, ZigBee, NFC, etc.).

The user interface 226 may include a display screen and/or one or more user input devices (e.g., touch screens, buttons, microphones, speakers, displays, keyboards, stylus inputs, mice, track pads, biometric sensors, etc.) to allow a user to interact with the user device 200, the server 100, the lockboxes 400, and/or any apps running on the user device 200. The location determination circuit 228 (e.g., a global positioning system ("GPS") receiver) may be configured to generate and facilitate providing a current location of the user device 200 and/or the current location of a respective lockbox 400 (e.g., the location data, etc.) to the server 100 to facilitate lockbox tracking.

According to an exemplary embodiment, the memory 206 of the user device 200 includes various modules or circuits configured to (i) receive and manage the encrypted user profiles received from the server 100 and (ii) transmit the encrypted user profiles and encrypted commands to the lockboxes 400. As shown in FIG. 3, the memory 206 of the user device 200 includes an application circuit 208 having a location circuit 210, a profile management circuit 212, a user input circuit 214, a lockbox circuit 216, and a command circuit 218. According to an exemplary embodiment, the location circuit 210 is configured to (i) receive the location data from the location determination circuit 228 regarding the current location of a respective lockbox 400 that the user device 200 is accessing or attempting to access and (ii) provide the location data to the first transceiver 222 to transmit to the server 100. In other embodiments, the location circuit 210 is configured to (i) receive the location data from the lockboxes 400 (e.g., in an audit trail) via the second transceiver 224 regarding the current location of a respective lockbox 400 accessed by the user device 200 and (ii) provide the location data received from the lockboxes 400 to the first transceiver 222 to transmit to the server 100

The profile management circuit 212 is configured to receive and store the encrypted user profiles and user keys transmitted to the first transceiver 222 of the user device 200 by the server 100. The profile management circuit 212 is further configured to drop (e.g., erase, delete, remove, etc.) the encrypted user profiles and user keys in accordance with commands from the server 100 and/or in response to a respective user profile expiring. The user input circuit 214 is configured to (i) provide various graphical user interfaces on a display of the user interface 226 and (ii) receive inputs provided to the user interface 226 by the user and perform functions associated therewith. The lockbox circuit 216 is configured to identify a respective lockbox 400 that the user device 200 is trying to access (e.g., based on an identifier broadcasted by the respective lockbox 400) and provide the corresponding encrypted user profile (e.g., without the appended user key, with the handshake nonce appended, etc.) stored in the profile management circuit 212 to the second transceiver 224 to deliver the encrypted user profile to the respective lockbox 400 to establish a communication session with the respective lockbox 400 to facilitate controlling various functions of the respective lockbox 400 (e.g., unlock, lock, activate key fob isolation, deactivate key fob isolation, change settings, update firmware, etc.).

The command circuit 218 is configured to generate and transmit an encrypted command to the respective lockbox 400. The encrypted command may include a command for the respective lockbox 400 to perform some action such as unlock, lock, activate key fob isolation, deactivate key fob isolation, change settings, update firmware, etc. According to an exemplary embodiment, the command is encrypted using the user key associated with the user profile that was transmitted to the respective lockbox 400 at the start of the communication session. In some embodiments, the command circuit 218 is configured to generate a modified reply nonce based on a reply nonce received from the respective lockbox 400 as described in more detail herein (e.g., in response to the respective lockbox 400 successfully decrypting the encrypted user profile, etc.). In such embodiments, the command circuit 218 is configured to encrypt the command using both the user key and the modified reply nonce.

Lockbox

In general, the lockbox 400 is configured to receive an encrypted user profile from a respective user device 200 and make an access and/or a management control decision based on the encrypted user profile (e.g., whether to permit unlocking, updating, deactivating key fob isolation, etc. by the respective user device 200). In some embodiments, the encrypted user profile may be provided to the lockbox 400 directly by the server 100 or indirectly by the server 100 through the vehicle 300.

Figure 4:
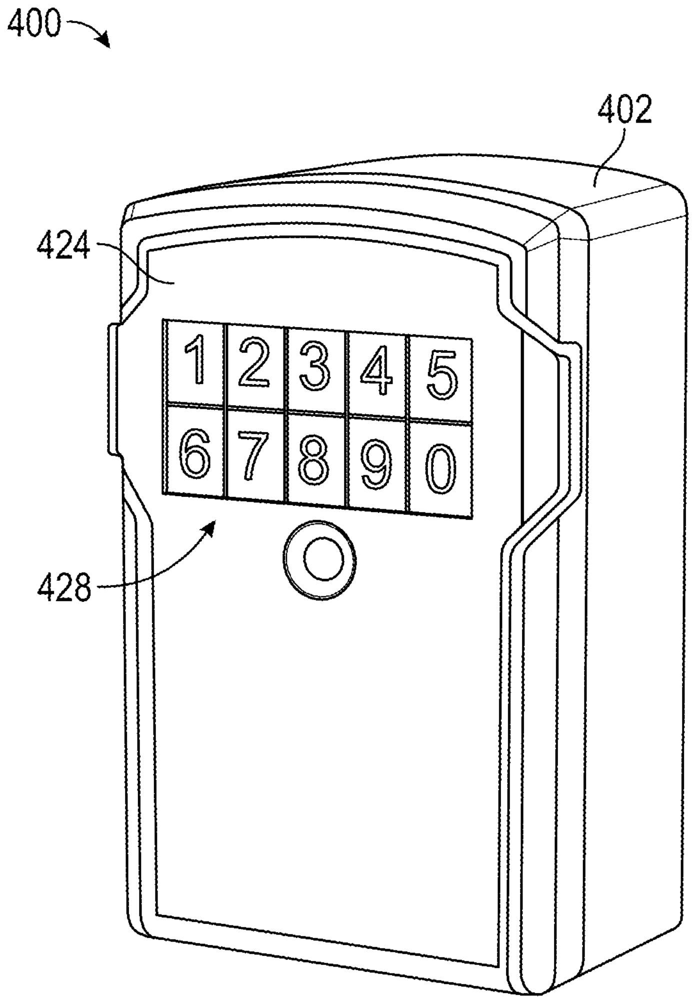
FIG. 4 is a perspective view of the lockbox of FIG. 1 in a closed configuration, according to an exemplary embodiment.
Figure 5:
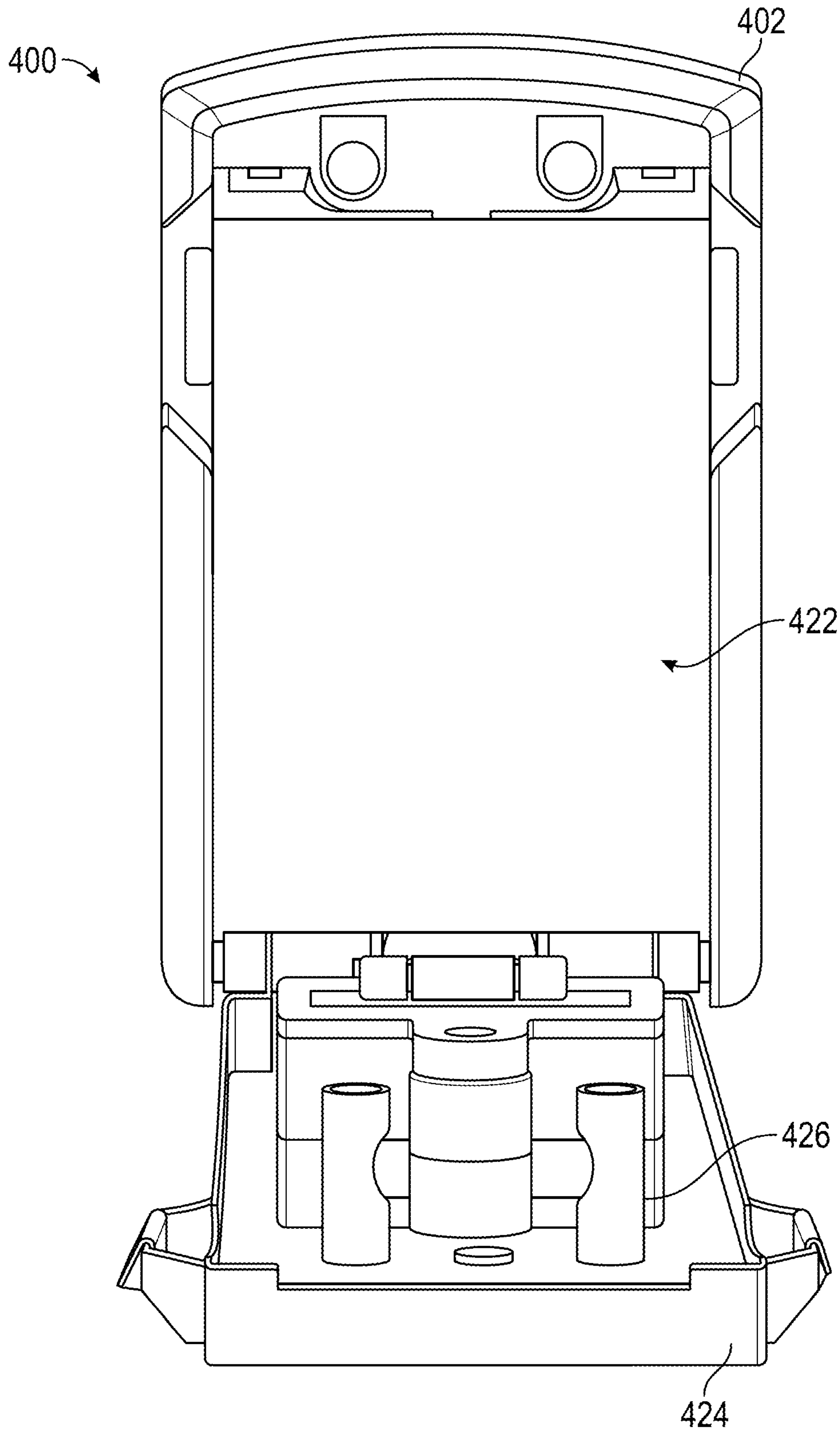
FIG. 5 is a front view of the lockbox of FIG. 1 in an open configuration, according to an exemplary embodiment.
Figure 6:
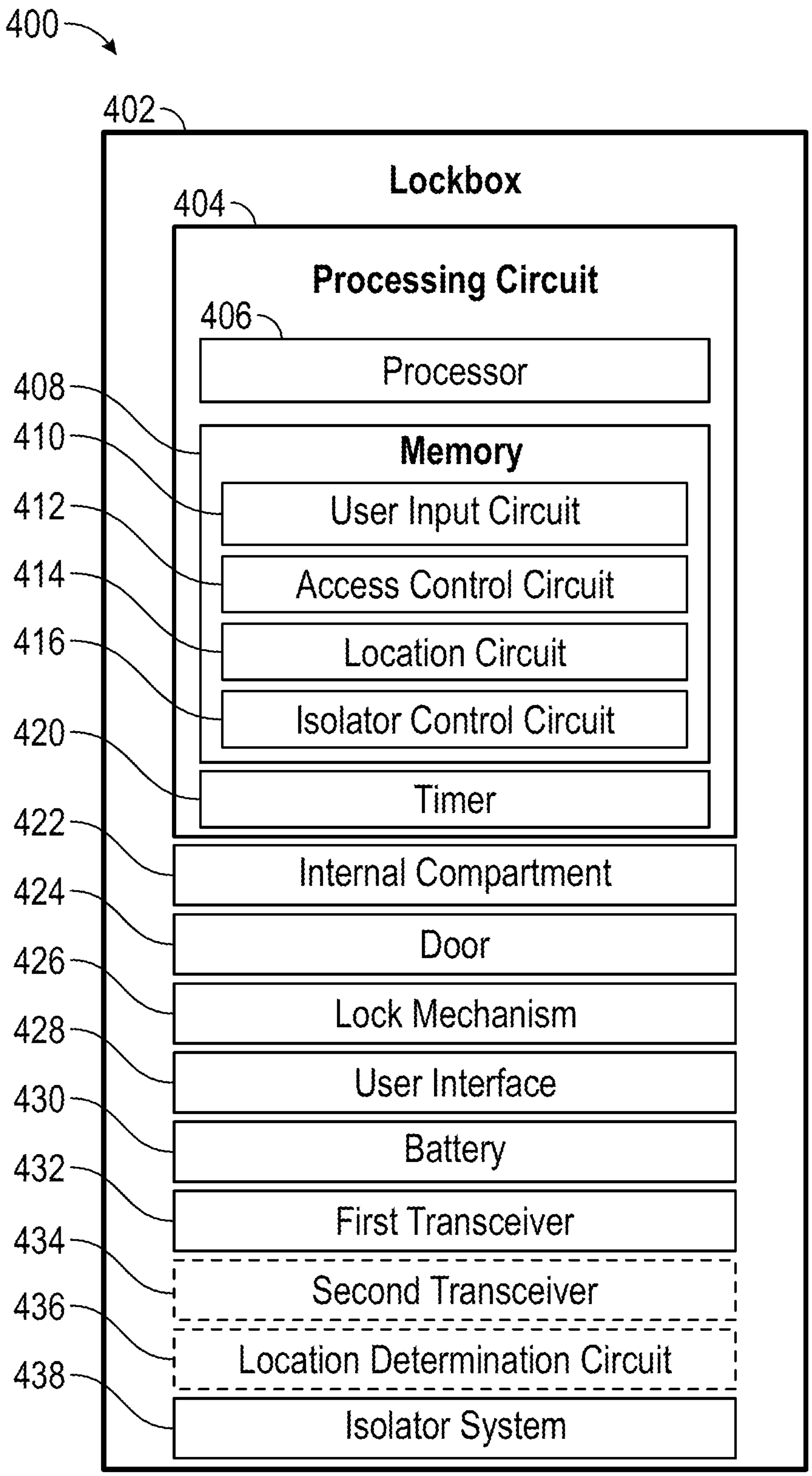
FIG. 6 is a schematic block diagram of the lockbox of FIG. 1, according to an exemplary embodiment.

As shown in FIGS. 4-6, the lockbox 400 includes a body, shown as external housing 402, that defines an interior chamber, shown as internal compartment 422; a processing circuit 404; a door, lid, or cover, shown as door 424, pivotally coupled to the external housing 402 and positioned to selectively enclose the internal compartment 422 when the door 424 is in a closed configuration or position (see FIG. 4) and permit selective access to the internal compartment 422 when the door 424 is in an open configuration or position (see FIG. 5); a securing mechanism, shown as lock mechanism 426, positioned to facilitate selectively locking the door 424 in the closed position; a user input/output device, shown as user interface 428, configured to facilitate providing manual inputs or commands to the lockbox 400; a power source, shown as battery 430, configured to facilitate operating one or more electrically-operated components of the lockbox 400; a first wireless communications interface, shown as first transceiver 432; a second wireless communications interface, shown as second transceiver 434; a location tracking system, shown as location determination circuit 436; and a key fob inhibitor assembly, shown as isolator system 438. In some embodiments, the lockbox 400 does not include the battery 430 (e.g., if the lockbox 400 is hardwired into the vehicle 300, etc.), the second transceiver 434, and/or the location determination circuit 436. In some embodiments, the lockbox 400 includes an input/output port (e.g., a USB port, a COM port, a networking port, etc.) that may be used to establish a physical connection to another device. For example, such a physical connection may be used by a manufacturer or owner to program or otherwise communicate with the lockbox 400.

The lock mechanism 426 may include one or more physical and/or electronic locking mechanisms (e.g., pins, shackles, dials, buttons, shafts, keyholes, motors, latches, deadbolts, etc.). The user interface 428 may include a display screen and/or one or more user input devices (e.g., touch screens, buttons, displays, a keypad, a directional pad, etc.) to allow a user to interact with the lockbox 400 (e.g., to enter manual commands, etc.). By way of example, the user interface 428 may facilitate waking the lockbox 400 from a sleep mode. By way of another example, the user interface 428 may facilitate manually entering a deactivation code to deactivate the isolator system 438. By way of still another example, the user interface 428 may facilitate manually entering an unlock code to unlock the lock mechanism 426. In some embodiments, the user interface 428 includes a key pad, mechanical dial, a d-pad, or other component configured to facilitate entering a manual code (e.g., an unlock code, a deactivation code, etc.). In some embodiments, the user interface 428 includes a keyway configured to receive a key (e.g., to manually unlock the lock mechanism 426, etc.). In some embodiments, the user interface 428 includes a biometric sensor configured to acquire a biometric of a user (e.g., a facial scan, a fingerprint, etc.).

In embodiments where the lockbox 400 includes the battery 430, the battery 430 is configured to provide power to electrical components (e.g., the lock mechanism 426, the first transceiver 432, the second transceiver 434, the location determination circuit 436, the isolator system 438, etc.) of the lockbox 400 to facilitate the operation thereof. The battery 430 may be rechargeable and/or replaceable. Such a battery operated lockbox 400 may therefore be portable. In embodiments that do not include the battery 430, the lockbox 400 may couple to another power source to facilitate the operation thereof (e.g., hardwired to a power source of the vehicle 300, etc.).

According to an exemplary embodiment, the first transceiver 432 is configured to facilitate communication between (i) the lockbox 400 and (ii) the user devices 200 or the vehicle 300 using a first communication protocol. By way of example, the first communication protocol may be a short-range communication protocol. In one embodiment, the first transceiver 432 includes Bluetooth components for establishing a Bluetooth connection with the second transceiver 224 of the user devices 200 or a similar transceiver of the vehicle 300. In another embodiment, the first transceiver 432 includes a different type of components that facilitate a different type of short-range and/or wireless communication protocol (e.g., radiofrequency, RFID, Wi-Fi, Bluetooth, ZigBee, NFC, etc.) with the user devices 200 and/or the vehicles 300. In embodiments where the lockbox 400 includes the second transceiver 434, the second transceiver 434 is configured to facilitate direct communication between the lockbox 400 and the server 100 using a second communication protocol. By way of example, the second communication protocol may be a long-range communication protocol. In an alternative embodiment, the lockbox 400 communicates with the server 100, the user devices 200, and/or the vehicle 300 using the same transceiver (e.g., only the first transceiver 432, via cellular, via Wi-Fi, etc.). In one embodiment, the second transceiver 434 includes cellular components for communicating with the server 100 via a cellular network. In other embodiments, the lockbox 400 is hardwired into the communication system of the vehicle 300 and, therefore, receives communications from the server 100 and/or the user devices 200 through the communication system of the vehicle 300.

In embodiments where the lockbox 400 includes the location determination circuit 436, the location determination circuit 436 (e.g., a GPS receiver) may be configured to generate and facilitate providing a current location of the lockbox 400 (e.g., the location data) to the user devices 200 (e.g., via the first transceiver 432), the vehicle 300 (e.g., via a hardwired connection, via the first transceiver 432, etc.), and/or directly to the server 100 (e.g., via the second transceiver 434).

As shown in FIG. 6, the processing circuit 404 has a processor 406, a memory 408, and a timer 420. The processing circuit 404 may include a general-purpose processor, an ASIC, one or more FPGAs, a DSP, circuits containing one or more processing components, circuitry for supporting a microprocessor, a group of processing components, or other suitable electronic processing components. In some embodiments, the processor 406 is configured to execute computer code stored in the memory 408 to facilitate the activities described herein. The memory 408 may be any volatile or non-volatile computer-readable storage medium capable of storing data or computer code relating to the activities described herein. According to an exemplary embodiment, the memory 408 includes computer code modules (e.g., executable code, object code, source code, script code, machine code, etc.) configured for execution by the processor 406. The timer 420 is configured to maintain a time value for the lockbox 400. For example, the timer 420 may be the clock of the processor 406 or may be any other time keeping circuit of the lockbox 400. The time value maintained by the timer 420 may be used in secured communications (e.g., in syncing time with the user devices 200, in providing timestamps related to events for logging purposes, etc.).

According to an exemplary embodiment, the memory 408 of the lockbox 400 includes various modules or circuits configured to make access and/or management control decisions. As shown in FIG. 6, the memory 408 of the lockbox 400 includes a user input circuit 410, an access control circuit 412, a location circuit 414, and an isolator control circuit 416. In some embodiments, the memory 408 does not include the location circuit 414 (e.g., in embodiments where the lockbox 400 does not include the location determination circuit 436).

The user input circuit 410 is configured to receive inputs through the user interface 428, the first transceiver 432, and/or the second transceiver 434. By way of example, the user input circuit 410 may receive a first manual access code to deactivate the isolator system 438. By way of another example, the user input circuit 410 may receive a second manual access code to unlock the lock mechanism 426. By way of another example, the user input circuit 410 may receive an encrypted user profile and/or an encrypted command from a respective user device 200, the server 100, and/or the vehicle 300 in which the lockbox 400 is located.

The access control circuit 412 is configured to store a lockbox identifier, a device key, the first manual access code, the second manual access code, and/or user biometric data for the lockbox 400. The access control circuit 412 may be configured to broadcast the lockbox identifier. In response to the broadcast, the lockbox 400 may receive an associated encrypted user profile from a respective user device 200 (or, alternatively, the vehicle 300 or the server 100). The access control circuit 412 is configured to decrypt the encrypted user profile using (i) the device key pre-stored thereon and/or (ii) the handshake nonce appended to the encrypted user profile (in embodiments where the handshake nonce is used) to obtain a user key from the decrypted user profile. In some embodiments, the access control circuit 412 is configured to generate and transmit a reply nonce to the respective user device 200 (or the vehicle 300 or the server 100) in response to successfully decrypting the encrypted user profile.

The access control circuit 412 may receive an encrypted command from the respective user device 200 (or the vehicle 300 or the server 100) (e.g., after successfully decrypting the encrypted user profile, etc.). The access control circuit 412 is configured to decrypt the encrypted command using the user key obtained from the decrypted user profile. In some embodiments, the access control circuit 412 is configured to generate a modified reply nonce based on the reply nonce to decrypt the encrypted command along with the user key (in embodiments where (i) the access control circuit 412 generates and transmits the reply nonce to the user device 200, the server 100, or the vehicle 300 and (ii) the user device 200, the server 100, or the vehicle 300 generates and encrypts the command with the user key and the modified reply nonce). The access control circuit 412 is configured to initiate an action specified by the decrypted command (e.g., unlock the lock mechanism 426, deactivate the isolator system 438, implement a firmware update, change the first manual access code, change the second manual access code, update the biometric data, etc.) in response to successfully decrypting the encrypted command.

According to an exemplary embodiment, the access control circuit 412 is configured to perform the decryption of the encrypted user profile and the encrypted command using a single decryption algorithm. By way of example, the decryption algorithm may be or include a Counter with Cipher Block Chaining-Message Authentication Code ("CCM") algorithm as described in further detail in *Recommendation for Block Cipher Modes of Operation: the CCM Mode for Authentication and Confidentiality* published by the National Institute of Standards and Technology in May 2004 and authored by Morris Dworkin, which is incorporated herein by reference in its entirety.

In some embodiments, the two key authentication scheme using the device key and the user key eliminates any need to pair (e.g., using Bluetooth pairing, etc.) the lockboxes 400 to the user devices 200 (or the vehicle 300 or the server 100) to create a secure communication session between the lockboxes 400 and the user devices 200 (or the vehicle 300 or the server 100). In such embodiments, the lockboxes 400, therefore, do not store the user keys received from the user devices 200 (or the vehicle 300 or the server 100) after a communication session between the lockboxes 400 and the user devices 200 (or the vehicle 300 or the server 100) ends (e.g., after implementing the command, due to the inability to decrypt the encrypted command, in response to a lack of receiving an encrypted command for a predefined period of time, etc.).

It should be understood that the two key authentication scheme implemented by the access control circuit 412 described herein is not meant to be limiting, but is provided as an example of one possible way to provide secure communication between the user devices 200 (or the vehicle 300 or the server 100) and the lockboxes 400. In other embodiments, secure communication is otherwise established by the access control circuit 412 using a different authentication scheme such as an authentication scheme that employs digital signatures, challenge-response procedures, multi-factor authentication (e.g., two-factor authentication, user profile plus a biometric, a user profile plus a PIN, etc.), and/or still other suitable authentication schemes.

In embodiments where the lockbox 400 includes the location determination circuit 436 and does not include the second transceiver 434, the location circuit 414 is configured to (i) receive the location data from the location determination circuit 436 regarding the current location of the lockbox 400 and (ii) provide the location data to the first transceiver 432 to transmit to a respective user device 200 (or vehicle 300) (which, in turn, is provided to the server 100 by the respective user device 200 or vehicle 300). In embodiments where the lockbox 400 includes the location determination circuit 436 and the second transceiver 434, the location circuit 414 is configured to (i) receive the location data from the location determination circuit 436 regarding the current location of the lockbox 400 and (ii) provide the location data to the second transceiver 434 to transmit directly to the server 100. In embodiments where the lockbox 400 does not include the location determination circuit 436, the user devices 200 that access the lockbox 400 and/or the vehicle 300 in which the lockbox 400 is located are configured to generate the location data, as described in further detail herein.

The isolator control circuit 416 is configured to operate the isolator system 438 in a deactivated mode, an active key fob isolation mode, and/or a reactive key fob isolation mode. The isolator control circuit 416 is configured to control deactivation of the isolator system 438 to operate the isolator system 438 in the deactivated mode in response to (i) the user input circuit 410 receiving a deactivation command (e.g., based on the first manual access code being entered, etc.) via the user interface 428 or (ii) the access control circuit 412 decrypting an encrypted command received from the user devices 200, the server 100, and/or the vehicle 300 that provides a deactivation command. In the deactivated mode, the isolator system 438 of the lockbox 400 does not isolate the key fob 302 such that the key fob 302 can receive one or more request signals from the vehicle 300 (e.g., a door unlock request signal, an engine/vehicle start request signal, etc.) and the key fob 302 can transmit one or more response signals (e.g., a door unlock command, an engine/vehicle start command, etc.) while positioned within the internal compartment 422 of the lockbox 400.

The isolator control circuit 416 is configured to control activation of the isolator system 438 to operate the isolator system 438 in the active key fob isolation mode or the reactive key fob isolation mode in response to (i) the user input circuit 410 receiving an activation command (e.g., based on the first manual access code being entered, etc.) via the user interface 428 or (ii) the access control circuit 412 decrypting an encrypted command received from the user devices 200, the server 100, and/or the vehicle 300 that provides an activation command. In some embodiments, the isolator control circuit 416 is configured to automatically activate or reactivate the isolator system 438 in response to the isolator system 438 being deactivated for a threshold period of time and/or in response to the lockbox 400 not moving for a threshold period of time (e.g., indicated by an accelerometer of the lockbox 400, indicating that the vehicle 300 is no longer being driven, etc.). In some embodiments, the isolator system 438 is capable of operating in only one of the active key fob isolation mode or the reactive key fob isolation mode. In some embodiments, the isolator system 438 is capable of operating in both the active key fob isolation mode and the reactive key fob isolation mode, separately. During the isolation mode(s), the isolator system 438 is configured to prevent a complete request-response communication between the vehicle 300 and the key fob 302 (e.g., by inhibiting, blocking, etc. one or more signals transmitted therebetween).

In the active key fob isolation mode, the isolator system 438 of the lockbox 400 (*i*) actively (e.g., continuously, substantially continuously, etc.) isolates the key fob 302 such that one or more the request signals transmitted by the vehicle 300 cannot reach the key fob 302 or (ii) actively (e.g., continuously, substantially continuously, periodically, etc.) outputs inhibition signals such that the one or more request signals are inhibited and unrecognizable by the key fob 302. The key fob 302, therefore, does not provide one or more response signals during the active key fob isolation mode.

In the reactive key fob isolation mode, the isolator system 438 of the lockbox 400 may perform one of the three following procedures. In a first reactive key fob isolation mode, the isolator system 438 of the lockbox 400 may be configured to (i) detect one or more request signals transmitted by the vehicle 300 and (ii) reactively output inhibition signals such that the one or more request signals are inhibited and unrecognizable by the key fob 302 and, therefore, the key fob 302 does not provide the one or more response signals. In a second reactive key fob isolation mode, the isolator system 438 of the lockbox 400 may be configured to (i) detect one or more request signals transmitted by the vehicle 300 and (ii) reactively output inhibition signals such that one or more response signals transmitted by the key fob 302 in response to receiving the one or more request signals are inhibited and unrecognizable by the vehicle 300 and, therefore, the vehicle 300 does not act on the one or more response signals. In a third reactive key fob isolation mode, the isolator system 438 of the lockbox 400 may be configured to (i) detect a first request signal transmitted by the vehicle 300 (e.g., a door unlock request signal, etc.) and then (ii) initiate the active key fob isolation mode such that a second, subsequent request signal (e.g., a vehicle start request signal, etc.) cannot reach or is unrecognizable by the key fob 302. Therefore, during the third reactive key fob isolation mode, the key fob 302 may transmit a first response signal (e.g., a door unlock command, etc.) to the vehicle 300, but will not transmit a second response signal (e.g., an engine/vehicle start command, etc.) to the vehicle 300.

In some embodiments, the isolator system 438 is capable of operating in only one of the three reactive key fob isolation modes. In some embodiments, the isolator system 438 is capable of operating in two or more of the reactive key fob isolation modes, separately. In such embodiments, the specific type of reactive key fob isolation mode implemented by the isolator system 438 is user selectable (e.g., based on the type of activation command provided to the lockbox 400, etc.).

Figure 7:
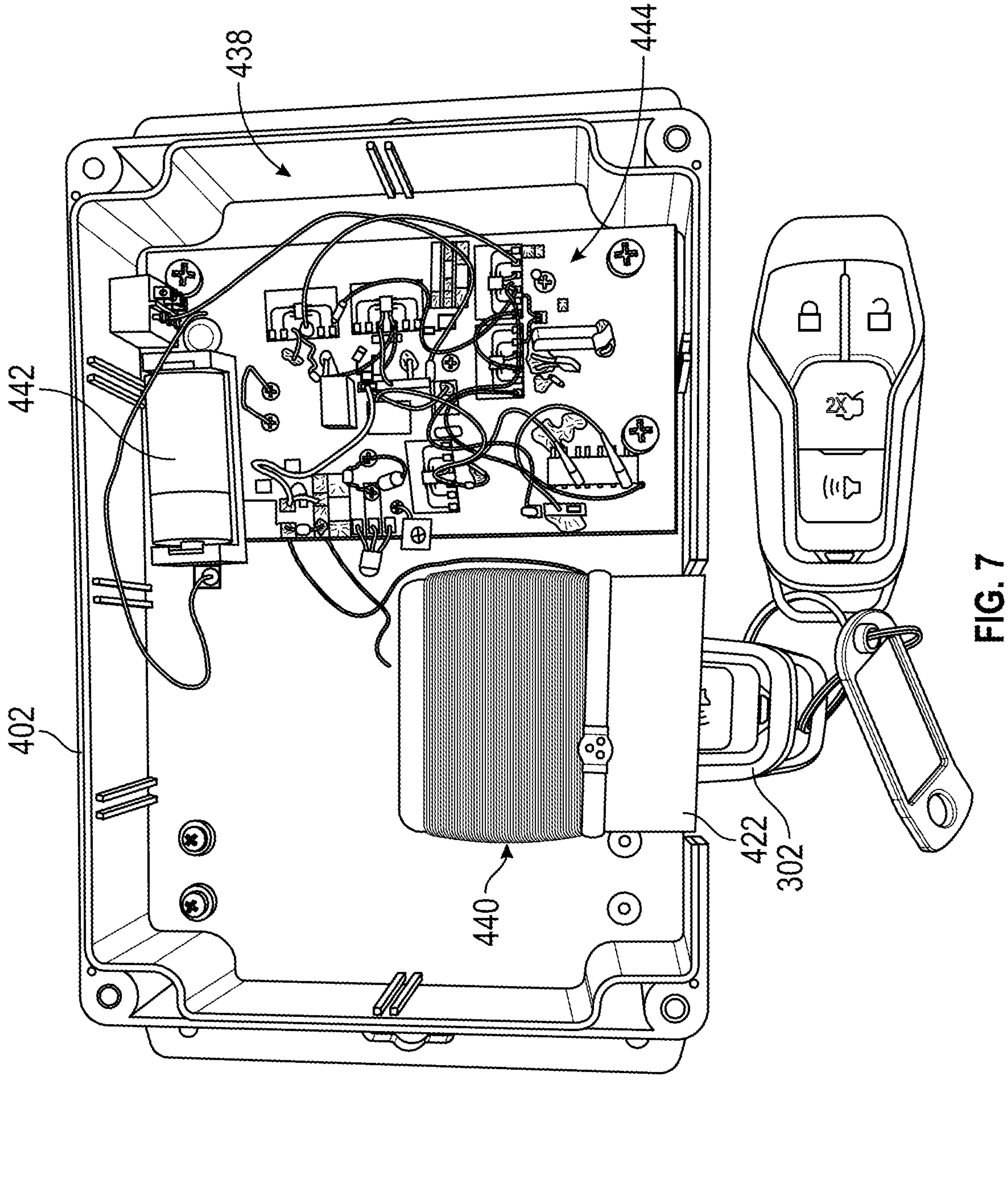
FIGS. 7 and 8 are various views of an isolator system of the lockbox of FIG. 1, according to an exemplary embodiment.
Figure 8:
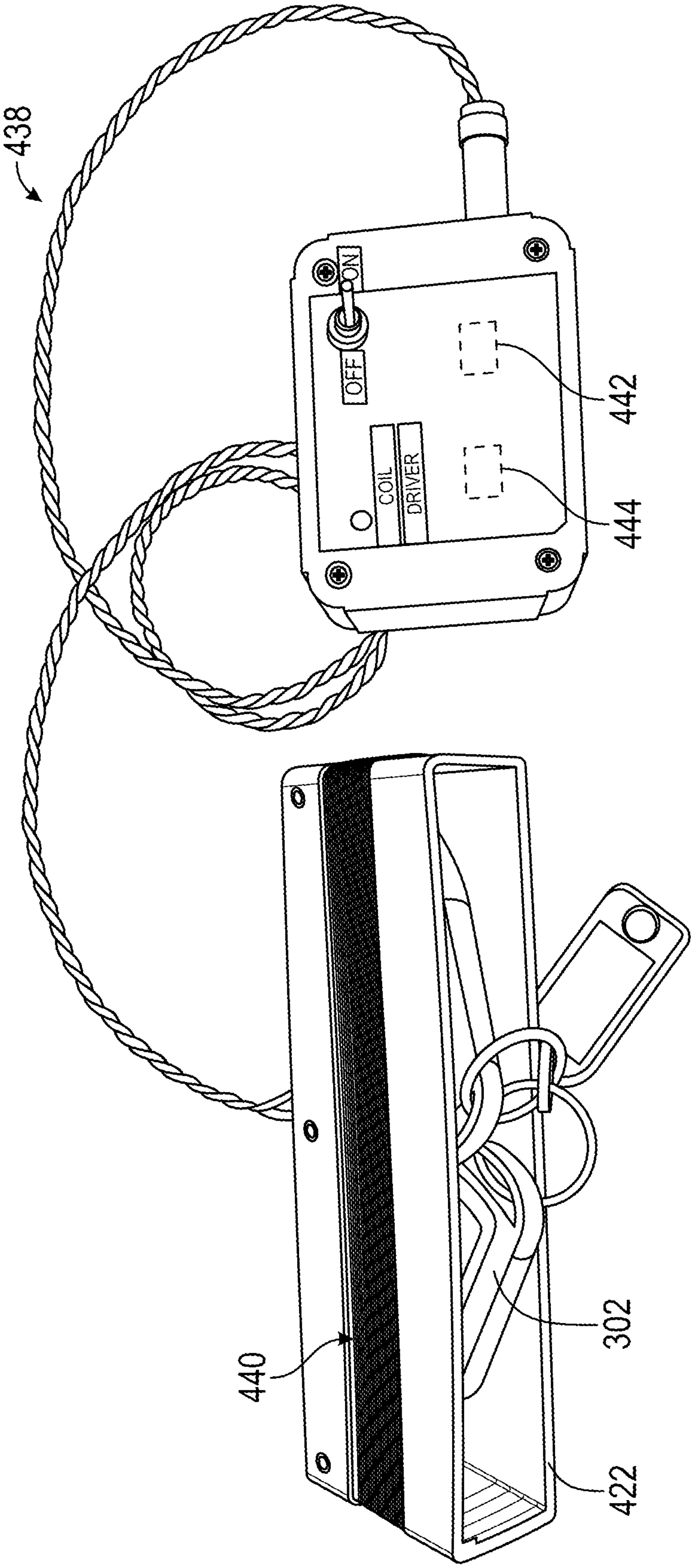

As shown in FIGS. 7 and 8, the isolator system 438 is configured to be positioned within the external housing 402 and includes the internal compartment 422; a coil (e.g., a metallic wire, a copper wire, etc.), shown as coupling coil 440, disposed (e.g., wound, coiled, etc.) around the internal compartment 422; a power source, shown as battery 442, configured to power electrical components the isolator system 438; and circuitry (e.g., on a circuit board, on a copper clad board, etc.), shown as isolator circuitry 444, coupled to the coupling coil 440 and the battery 442.

As shown in FIG. 7, the internal compartment 422 is sized to receive a single key fob 302. As shown in FIG. 8, the internal compartment 422 is sized to receive a pair of key fobs 302. Accordingly, the internal compartment 422 may be sized to be relatively small and compact such that the internal compartment 422 is just large enough to fit a desired number of key fobs 302 therein (i.e., the internal compartment 422 has an internal volume approximately equal to or slightly larger than the number of key fobs 302 the internal compartment 422 is designed to accommodate). By way of example, the internal compartment 422 may have an internal volume that is between twelve square inches and four square inches (e.g., 12, 11, 10, 9, 8, 7, 6, 5, 4, etc. square inches) for a two key fob compartment. By way of another example, the internal compartment 422 may have an internal volume that is between six square inches and two square inches (e.g., 6, 5, 4, 3, 2, etc. square inches) for a one key fob compartment. Applicant has discovered that minimizing the size of the internal compartment 422 requires less energy/battery power to inhibit or block the signals transmitted by the vehicle 300 and/or the key fob 302 (e.g., by optimizing the magnetic coupling between the ferrite loop antenna in the key fob 302 and the coupling coil 440, etc.). Minimizing the battery power required to perform such inhibition or blocking increases the life cycle of the battery 442 (e.g., before needing to be recharged, before needing to be replaced, etc.). Additionally, minimizing the energy improves electromagnetic compatibility ("EMC") such that the isolator circuitry 444 satisfies the Federal Communications Commission ("FCC") general radio frequency ("RF") emission requirement in the Code of Federal Regulations FCC Part 15.

In some embodiments, the battery 442 and the battery 430 are one in the same. In some embodiments, the battery 442 is designated just for powering components necessary for operation of the isolator system 438 (e.g., energizing the coupling coil 440, powering circuit components of the isolator circuitry 444, powering the first transceiver 432, powering the second transceiver 434, etc.). In some embodiments, the battery 442 is rechargeable and/or replaceable. In some embodiments, the isolator system 438 is operable for at least one year on the battery 442 without requiring replacement. In such embodiments, the battery 442 may include or may be equivalent to two AA alkaline battery cells.

Applicant has tested and analyzed the RF characteristics of the low frequency vehicle side of various vehicle key fob communication systems available on the market today. The low frequency vehicle side of all of the vehicle key fob communication systems tested transmitted data packets (i.e., the request signals) at approximately 125 kHz to the key fobs. The length of a single data packet ranged from approximately 17 milliseconds ("ms") to approximately 30 ms. The longest "on time" of a single bit in the data packets was approximately 600 microseconds ("μs"), which includes an on time of approximately 300 μs followed by an off time of approximately 300 μs. Applicant has determined that the isolator system 438 can effectively prevent the key fob 302 from receiving a recognizable request signal from the vehicle 300 by providing a signal burst at approximately 125 kHz for at least 1 ms in length at a minimum of once per data packet cycle of the vehicle 300 (e.g., by energizing the coupling coil 440 via the battery 442 and the isolator circuitry 444 accordingly). This would consume the least amount of energy while providing at least one year's worth of battery life when using two AA alkaline batteries or equivalent thereof. For example, the battery capacity of AA alkaline battery cells is 2.5 Amp-hours ("Ah"). The number of hours in one year is 8,760 hours. Therefore, the maximum amount of average current draw from the AA alkaline battery cell (assuming continuous operation) can be no more than 285 micro amps ("μA"). Two such systems than can provide this battery longevity are shown in FIGS. 9 and 10.

Figure 9:
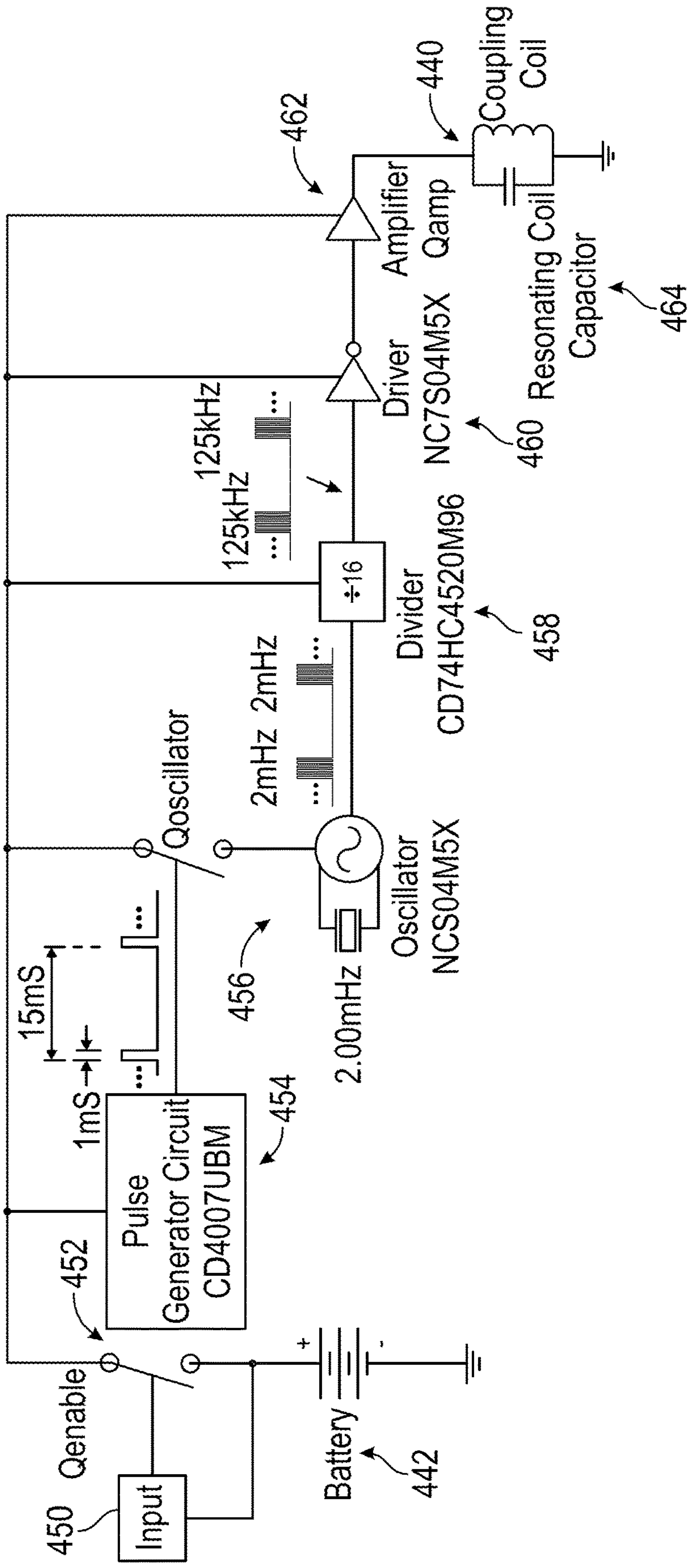
FIG. 9 is a schematic circuit diagram of isolator circuitry of the isolator system of FIGS. 7 and 8, according to an exemplary embodiment.

Referring to FIG. 9, the isolator system 438 is shown including a first type of the isolator circuitry 444, shown as first isolator circuitry 446. According to an exemplary embodiment, the first isolator circuitry 446 is configured to provide a substantially continuous, repeating 125 kHz burst signal for at least 1 ms at least once per data packet cycle of the vehicle 300 such that the key fob 302 receives an unrecognizable request signal from the vehicle 300 (i.e., the active key fob isolation mode). The above burst frequency and burst length are provided for example and it should be understood that other burst frequencies and burst lengths may be suitable to provide a similar result.

As shown in FIG. 9, the first isolator circuitry 446 (i) includes an input 450, an activation switch 452, a pulse generator circuit 454, an oscillator 456 (e.g., a 2 MHz crystal oscillator, etc.), a divider 458 (e.g., a "divide by 16 circuit," etc.), a driver 460 (e.g., an inverter, etc.), an amplifier 462 (e.g., a bipolar transistor amplifier stage operated in a high efficiency grounded base class C configuration, etc.), and resonating capacitor 464 and (ii) is coupled to the battery 442 and the coupling coil 440. The input 450 is configured to receive an activation command (e.g., from the isolator control circuit 416, etc.), which causes the activation switch 452 to engage, thereby activating the first isolator circuitry 446. The pulse generator circuit 454 is configured to then generate a pulse of 1 ms in width every 15 ms. The pulse generated by the pulse generator circuit 454 activates the oscillator 456, which is configured to produce a 1 ms burst of 2 MHz every 15 ms. The 2 MHz burst is sent through the divider 458, which is configured to produce the burst of 125 kHz. The 125 kHz burst is then sent through the driver 460, which is configured to drive the amplifier 462. This sets up an oscillating current in the coupling coil 440 and resonating capacitor 464. As described above, the internal compartment 422 is sized such that the coupling coil 440 is closely coupled to the antennas (e.g., ferrite coil antennas, etc.) in the key fob 302. Therefore, if the vehicle 300 transmits a request signal to the key fob 302, the 1 ms 125 kHz burst introduces an error in the request signal such that the key fob 302 will not recognize the request signal and, therefore, the key fob 302 will not respond back to the vehicle 300 on its UHF.

Figure 10:
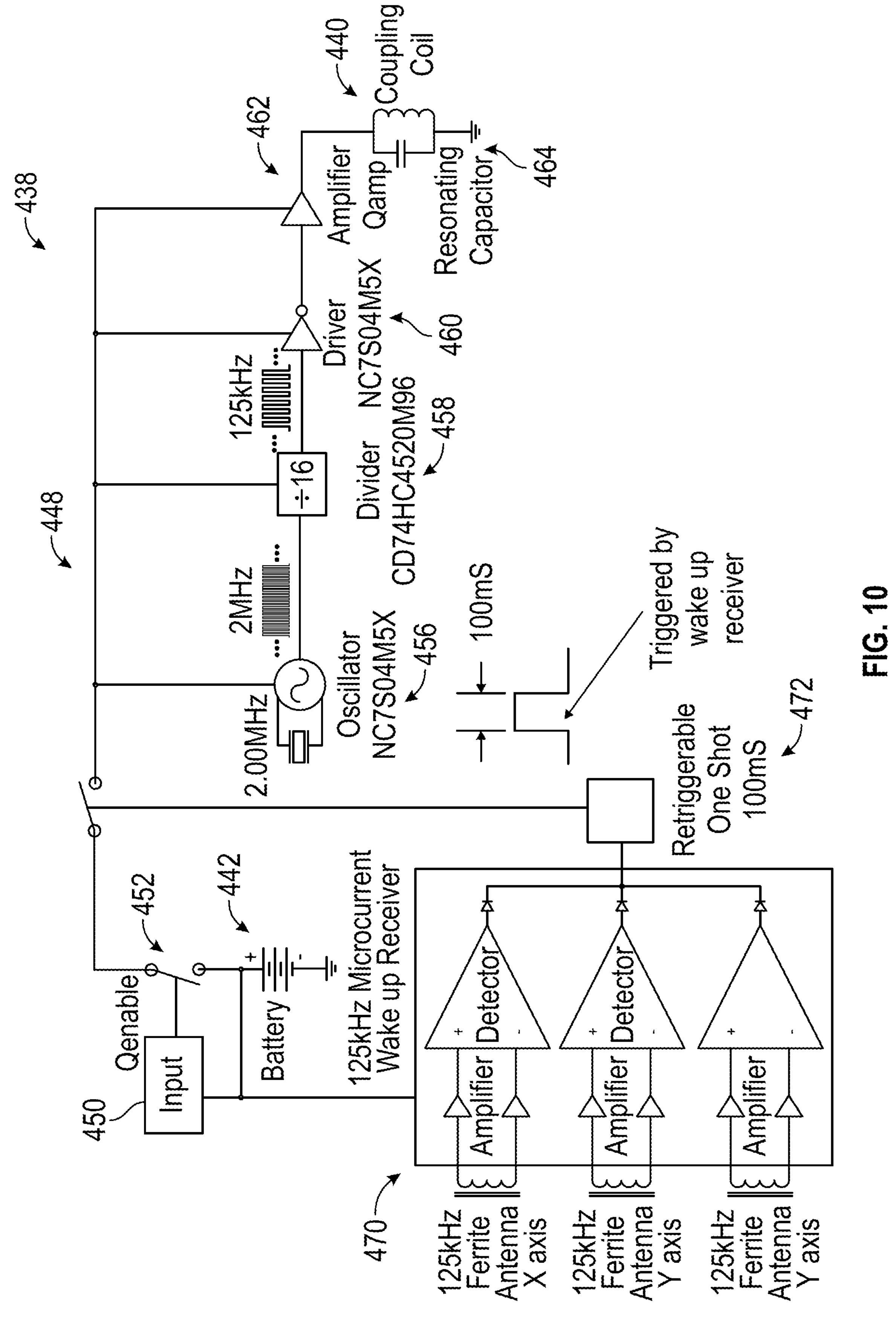
FIG. 10 is a schematic circuit diagram of isolator circuitry of the isolator system of FIGS. 7 and 8, according to another exemplary embodiment.

Referring to FIG. 10, the isolator system 438 is shown including a second type of the isolator circuitry 444, shown as second isolator circuitry 448. According to an exemplary embodiment, the second isolator circuitry 448 is configured to provide a 125 kHz burst for at least 1 ms in response to detecting a request signal transmitted by the vehicle 300 such that the key fob 302 receives an unrecognizable request signal from the vehicle 300 (i.e., the reactive key fob isolation mode). Again, the above burst frequency and burst length are provided for example and it should be understood that other burst frequencies and burst lengths may be suitable to provide a similar result.

As shown in FIG. 10, the second isolator circuitry 448 (*i*) includes the input 450, the activation switch 452, the oscillator 456, the divider 458, the driver 460, the amplifier 462, the resonating capacitor 464, and (a) a wake up circuit 470 (e.g., a micro current wake up receiver, a ferrite three axis antenna similar to what may be used in the key fob 302, etc.) and (b) a monostable 472 in place of the pulse generator circuit 454 and (ii) is coupled to the battery 442 and the coupling coil 440. The input 450 is configured to receive an activation command (e.g., from the isolator control circuit 416, etc.), which causes the activation switch 452 to engage, thereby activating the second isolator circuitry 448. When the wake up circuit 470 receives/detects a 125 kHz data packet (i.e., a request signal) from the vehicle 300, the wake up circuit 470 is configured to trigger the monostable 472, which is configured to produce a one shot, 100 ms pulse. The 100 ms pulse turns on the oscillator 456, which is configured to produce a 100 ms burst of 2 MHz. The 2 MHz burst is sent through the divider 458, which is configured to produce the burst of 125 kHz. The 125 kHz burst is then sent through the driver 460, which is configured to drive the amplifier 462. This sets up an oscillating current in the coupling coil 440 and the resonating capacitor 464. As described above, the internal compartment 422 is sized such that the coupling coil 440 is closely coupled to the antennas in the key fob 302. Therefore, if the vehicle 300 transmits a request signal to the key fob 302, the 1 ms 125 kHz burst introduces an error in the request signal such that the key fob 302 will not recognize the request signal and, therefore, the key fob 302 will not respond back to the vehicle 300 on its UHF.

Figure 11A:
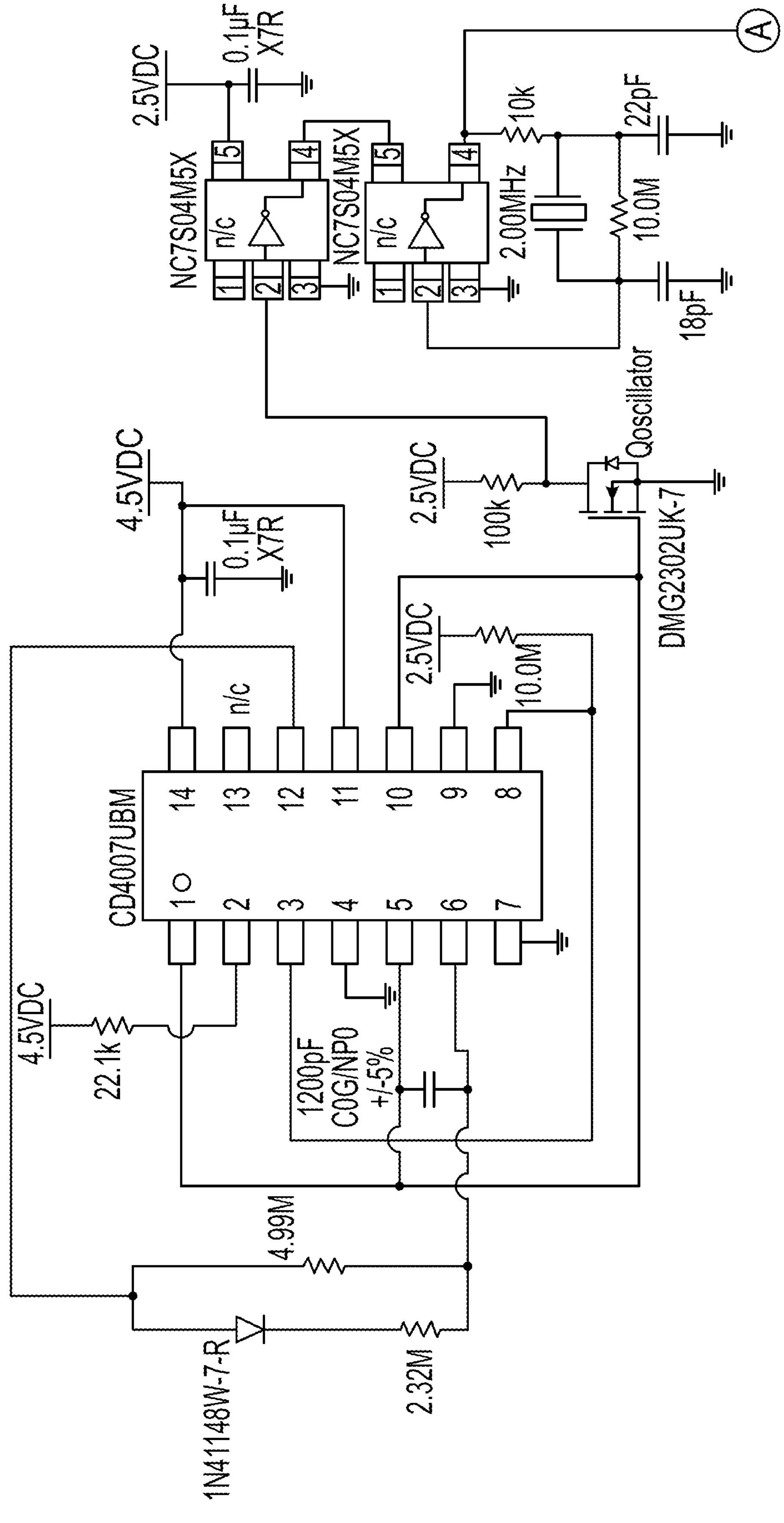
FIGS. 11A and 11B are a schematic circuit diagram of a burst generation portion of the isolator circuitry of FIGS. 9 and 10, according to an exemplary embodiment.
Figure 11B:
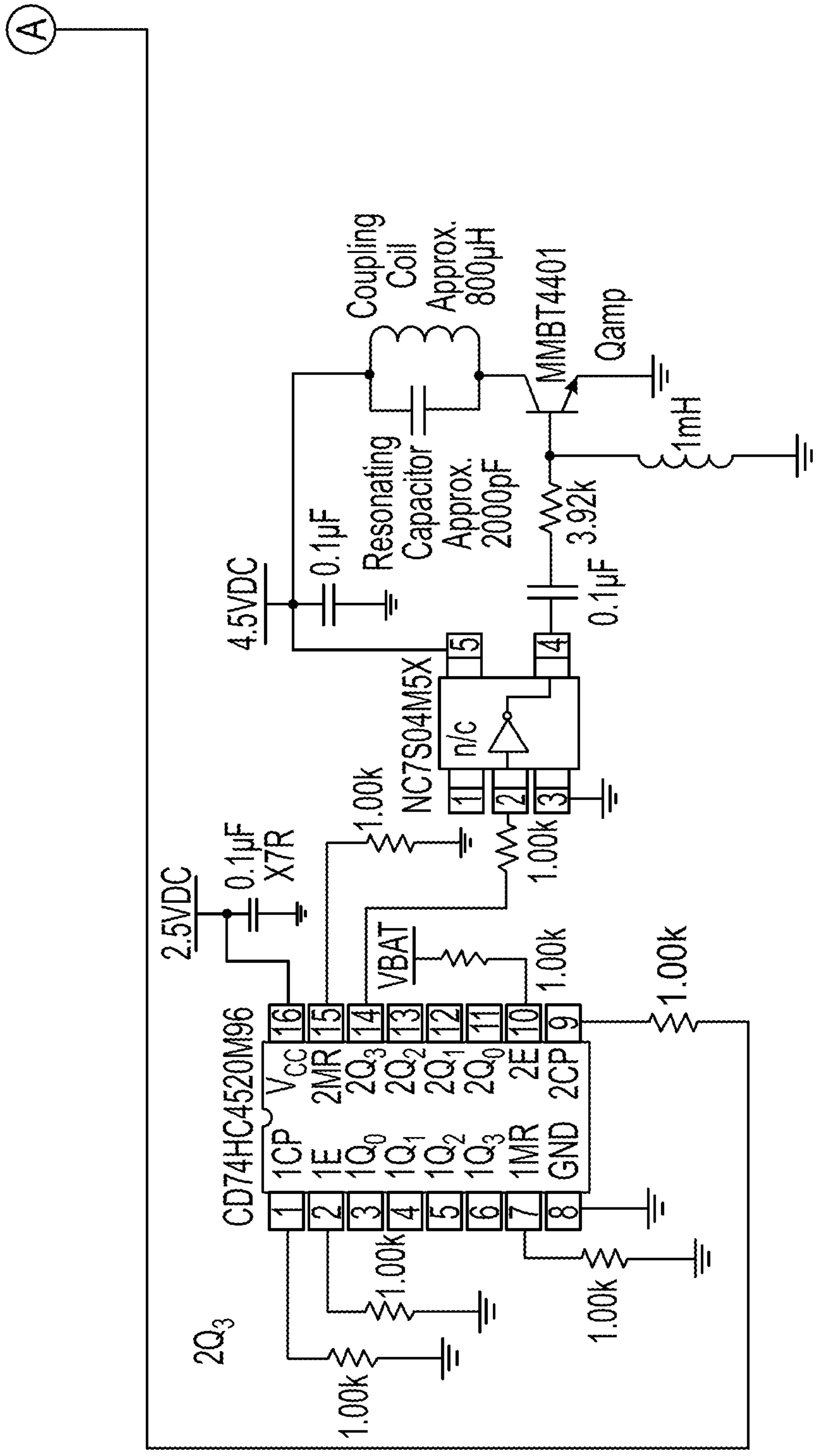
Figure 12:
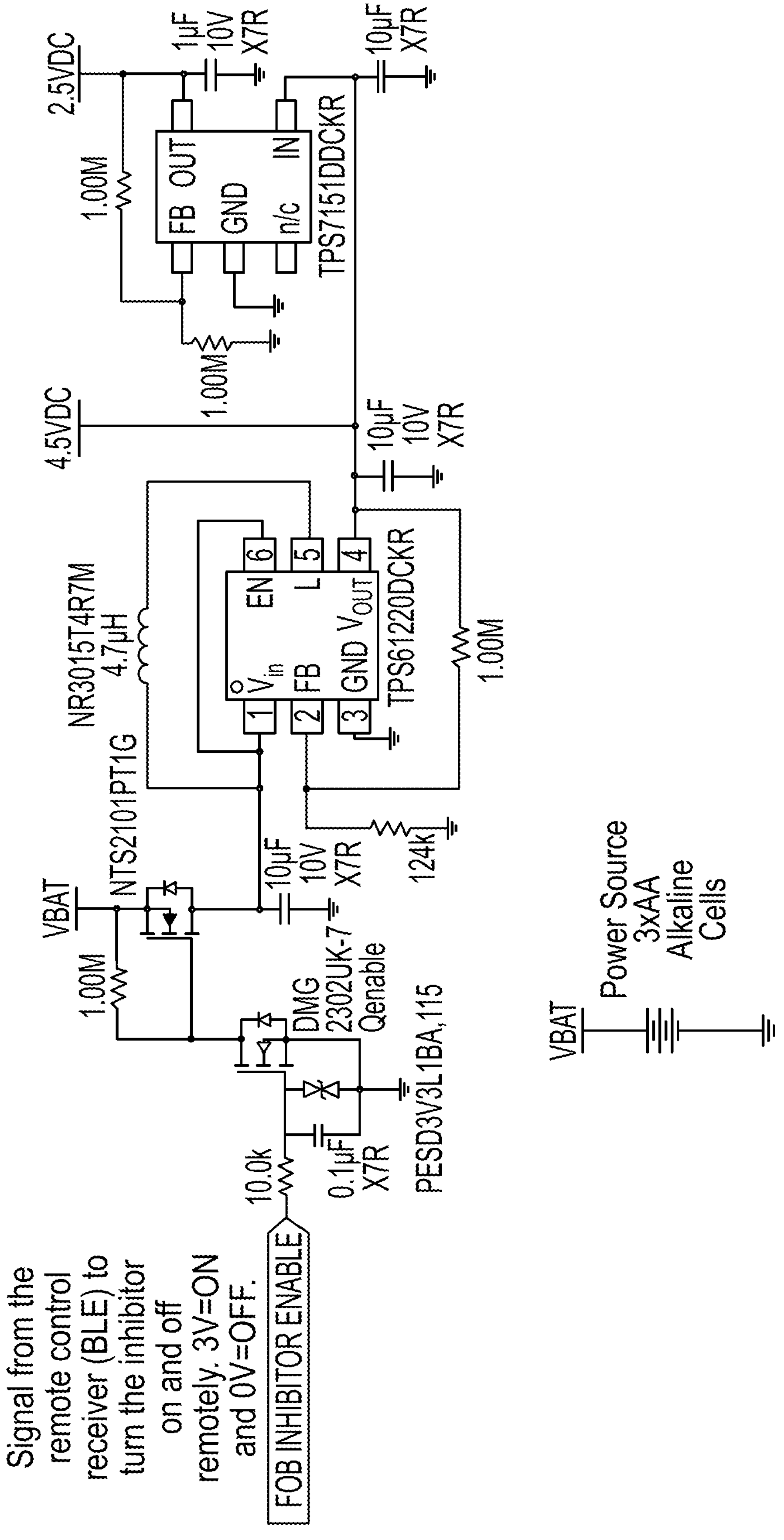
FIG. 12 is a schematic circuit diagram of a power supply portion of the isolator circuitry of FIGS. 9 and 10, according to an exemplary embodiment.

FIGS. 11A and 11B provide a more detailed circuitry schematic of the 125 kHz generation portion of the isolator circuitry 444 (e.g., the first isolator circuitry 446, the second isolator circuitry 448, etc.). FIG. 12 provides a more detailed circuitry schematic of the power supply portion of the isolator circuitry 444. According to an exemplary embodiment, the power supply portion provides two regulated voltages that permit some of the isolator circuitry 444 to operate at a lower voltage and, therefore, consume less power. The circuitry that provides the current to the coupling coil 440 is also regulated to be constant regardless of battery condition and, therefore, the coupling coil 440 is provided a constant amplitude regardless of the battery condition.

It should be understood the various isolator circuitry disclosed in FIGS. 9-12 are just a few possible implementations to provide the active and reactive key fob isolation modes of the isolator system 438. Accordingly, the circuit diagrams are provided as examples of circuitry that could be used and, therefore, this disclosure is not limited to the circuit arrangements and operating parameters shown and described with respect to FIGS. 9-12.

In an alternative embodiment, the lockbox 400 includes passive shielding material (e.g., RF shielding, etc.) that is configured to block the vehicle signals and/or the key fob signals so long at the door 424 of the lockbox 400 is closed. In such an embodiment, the lockbox 400 may include an actuator that facilitates opening and closing the door 424 (e.g., remotely, via the user devices 200, via the server 100 directly, via the server 100 through the vehicle 300, etc.) such that the vehicle signals can reach the key fob 302 and the key fob signals can reach the vehicle 300. For example, the processing circuit 404 may be configured to keep the door 424 closed to inhibit the communication during a first or isolation mode. Then, in response to receiving a deactivation command (e.g., wirelessly, through the user interface 428, etc.), the processing circuit 404 may be configured to engage the actuator to open the door 424 to permit the communication during a second or communication mode. The processing circuit 404 may then be configured to engage the actuator to close the door 424 when returning to the first mode (e.g., in response to receiving an activation command, in response to detecting the vehicle 400 is turned off, after an elapsed time period, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the key fob isolation system 10 and the components thereof as shown in the various exemplary embodiments is illustrative only. Additionally, any element disclosed in one embodiment may be incorporated or utilized with any other embodiment disclosed herein.

The invention claimed is:

1. A lockbox comprising:

a housing defining an internal compartment structured to receive a communication device;

at least one of:

(i) a wireless communications interface configured to facilitate wireless communication with an external device; or (ii) a user interface disposed along an exterior of the housing; and an inhibitor system including:

a coil disposed around the internal compartment; and a controller configured to:

energize the coil to inhibit at least one of:

(i) a first signal transmitted by the vehicle such that (a) the first signal does not reach the communication device or (b) the first signal is unrecognizable by the communication device; or (ii) a second signal transmitted by the wireless communication device such that (a) the second signal does not reach the vehicle or (b) the second signal is unrecognizable by the vehicle;

receive a deactivation signal from at least one of (i) the external device via the wireless communications interface or (ii) the user interface in response to an input provided thereto; and de-energize the coil in response to receiving the deactivation signal such that the first signal reaches the communication device in a recognizable form, the communication device transmits the second signal to the vehicle in response to the first signal, and the second signal reaches the vehicle in a recognizable form.

2. The lockbox of claim 1, wherein the controller is configured to selectively operate the inhibitor system in an active mode, and wherein, during the active mode, the controller is configured to actively energize the coil to inhibit the first signal such that (a) the first signal does not reach the communication device or (b) the first signal is unrecognizable by the communication device and, therefore, the communication device does not transmit the second signal.

3. The lockbox of claim 1, wherein the controller is configured to selectively operate the inhibitor system in a reactive mode, and wherein, during the reactive mode, the controller is configured to:

detect the first signal transmitted by the vehicle; and reactively energize the coil to inhibit the first signal such that (a) the first signal does not reach the communication device or (b) the first signal is unrecognizable by the communication device and, therefore, the communication device does not transmit the second signal.

4. The lockbox of claim 1, wherein the controller is configured to selectively operate the inhibitor system in a reactive mode, and wherein, during the reactive mode, the controller is configured to:

detect the first signal transmitted by the vehicle; and reactively energize the coil to inhibit the second signal such that (a) the second signal does not reach the vehicle or (b) the second signal is unrecognizable by the vehicle and, therefore, the vehicle does not act on the second signal.

5. The lockbox of claim 1, wherein the first signal includes a door unlock request signal and a vehicle start request signal, wherein the second signal includes a door unlock response signal and a vehicle start response signal, wherein the controller is configured to selectively operate the inhibitor system in a reactive mode, and wherein, during the reactive mode, the controller is configured to:

detect the door unlock request signal transmitted by the vehicle;

allow the communication device to transmit the door unlock response signal such that doors of the vehicle unlock; and energize the coil to inhibit the vehicle start request signal such that (a) the vehicle start request signal does not reach the communication device or (b) the vehicle start request signal is unrecognizable by the communication device and, therefore, the communication device does not transmit the vehicle start response signal to the vehicle.

6. The lockbox of claim 1, further comprising a door positioned to enclose the internal compartment and a locking mechanism positioned to selectively lock the door to prevent access to the internal compartment, wherein the controller is configured to receive an unlock signal from at least one of (i) the external device via the wireless communications interface or (ii) the user interface in response to a second input provided thereto, wherein the unlock signal provided by the external device requires a different permission level than the deactivation signal.

7. The lockbox of claim 1, wherein the first signal is at least one of a door unlock request or a vehicle start request.

8. The lockbox of claim 1, further comprising the wireless communications interface, wherein the controller is configured to receive the deactivation signal from the external device via the wireless communications interface.

9. The lockbox of claim 1, further comprising the user interface, wherein the controller is configured to receive the deactivation signal from the user interface in response to the input provided thereto.

10. The lockbox of claim 1, further comprising a battery disposed within the housing and coupled to the coil.

11. The lockbox of claim 1, wherein the lockbox is configured to be hardwired to a power source of the vehicle.

12. The lockbox of claim 1, wherein the external device is a portable device.

13. The lockbox of claim 1, wherein the external device is a remote server.

14. The lockbox of claim 1, wherein the external device is the vehicle, and wherein the vehicle acts as an intermediary between the wireless communications interface and a remote server.

15. The lockbox of claim 1, wherein the communication device is a key fob.

16. A lockbox comprising:

a housing defining an internal compartment structured to receive a communication device;

a door positioned to enclose the internal compartment;

an inhibitor positioned to facilitate selectively inhibiting communication between the communication device and an external device; and a controller configured to control the inhibitor;

wherein the inhibitor is operable in a first mode where communication between the communication device and the external device is inhibited;

wherein the inhibitor is operable in a second mode where the communication between the communication device and the external device is permitted;

wherein the inhibitor includes a coil disposed around the internal compartment;

wherein the controller is configured to energize the coil to inhibit the communication during the first mode;

wherein the controller is configured to de-energize the coil to permit the communication during the second mode; and wherein at least one of the communication device is a key fob or the external device is a vehicle.

17. The lockbox of claim 16, wherein the communication device is a key fob and the external device is a vehicle.

18. A lockbox comprising:

a housing defining an internal compartment structured to receive a communication device;

a door positioned to enclose the internal compartment;

an inhibitor positioned to facilitate selectively inhibiting communication between the communication device and an external device; and a controller configured to control the inhibitor;

wherein the inhibitor is operable in a first mode where communication between the communication device and the external device is inhibited;

wherein the inhibitor is operable in a second mode where the communication between the communication device and the external device is permitted;

wherein the inhibitor includes a coil disposed around the internal compartment;

wherein the controller is configured to energize the coil to inhibit the communication during the first mode; and wherein the controller is configured to de-energize the coil to permit the communication during the second mode.

19. A lockbox comprising:

a housing defining an internal compartment structured to receive a communication device;

a door positioned to enclose the internal compartment;

an inhibitor positioned to facilitate selectively inhibiting communication between the communication device and an external device; and a controller configured to control the inhibitor;

wherein the inhibitor is operable in a first mode where communication between the communication device and the external device is inhibited;

wherein the inhibitor is operable in a second mode where the communication between the communication device and the external device is permitted;

wherein the inhibitor includes a passive shielding material and an actuator positioned to open and close the door, wherein the controller is configured to keep the door closed to inhibit the communication during the first mode; and wherein the controller is configured to at least one of (i) engage the actuator to open the door to permit the communication during the second mode or (ii) engage the actuator to close the door when returning to the first mode from the second mode.

* * * * *